United States Patent
Oomori et al.

(10) Patent No.: US 7,039,328 B2
(45) Date of Patent: May 2, 2006

(54) DATA REGENERATOR AND OPTICAL RECEIVER

(75) Inventors: Hirotaka Oomori, Yokohama (JP); Shigeru Inano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 818 days.

(21) Appl. No.: 10/131,502

(22) Filed: Apr. 25, 2002

(65) Prior Publication Data

US 2002/0167707 A1 Nov. 14, 2002

(30) Foreign Application Priority Data

Apr. 26, 2001 (JP) .............................. 2001-129673

(51) Int. Cl.
*H04B 10/06* (2006.01)
*H04B 17/02* (2006.01)

(52) U.S. Cl. ..................................... 398/202; 375/211

(58) Field of Classification Search ........ 398/173–181, 398/202–214; 375/211–214
See application file for complete search history.

(56) References Cited

U.S. PATENT DOCUMENTS

| 4,823,360 A | * | 4/1989 | Tremblay et al. ........... 375/214 |
| 6,057,951 A | * | 5/2000 | Sugawara .................... 398/209 |
| 6,519,302 B1 | * | 2/2003 | Bruce et al. ................. 375/355 |
| 6,554,490 B1 | * | 4/2003 | Sumi et al. ................... 385/88 |

FOREIGN PATENT DOCUMENTS

JP          10-13396         1/1998

* cited by examiner

*Primary Examiner*—Agustin Bello
*Assistant Examiner*—David Lee
(74) *Attorney, Agent, or Firm*—McDermott Will & Emery LLP

(57) ABSTRACT

The invention relates to a data regenerator and an optical receiver with low power consumption. The data regenerator comprises a data decision circuit, a decision parameter generator circuit, a decision parameter control circuit and a power control circuit. The data decision circuit decides data included in an input signal using decision parameters. The decision parameters are generated in the parameter generator. The decision parameters are specified by the parameter control. The parameter control operates only when receiving operating power. The power supply to the parameter control is controlled by the power control. Since power is supplied to the parameter control only when it is necessary to update the parameters, power consumption is reduced.

16 Claims, 17 Drawing Sheets

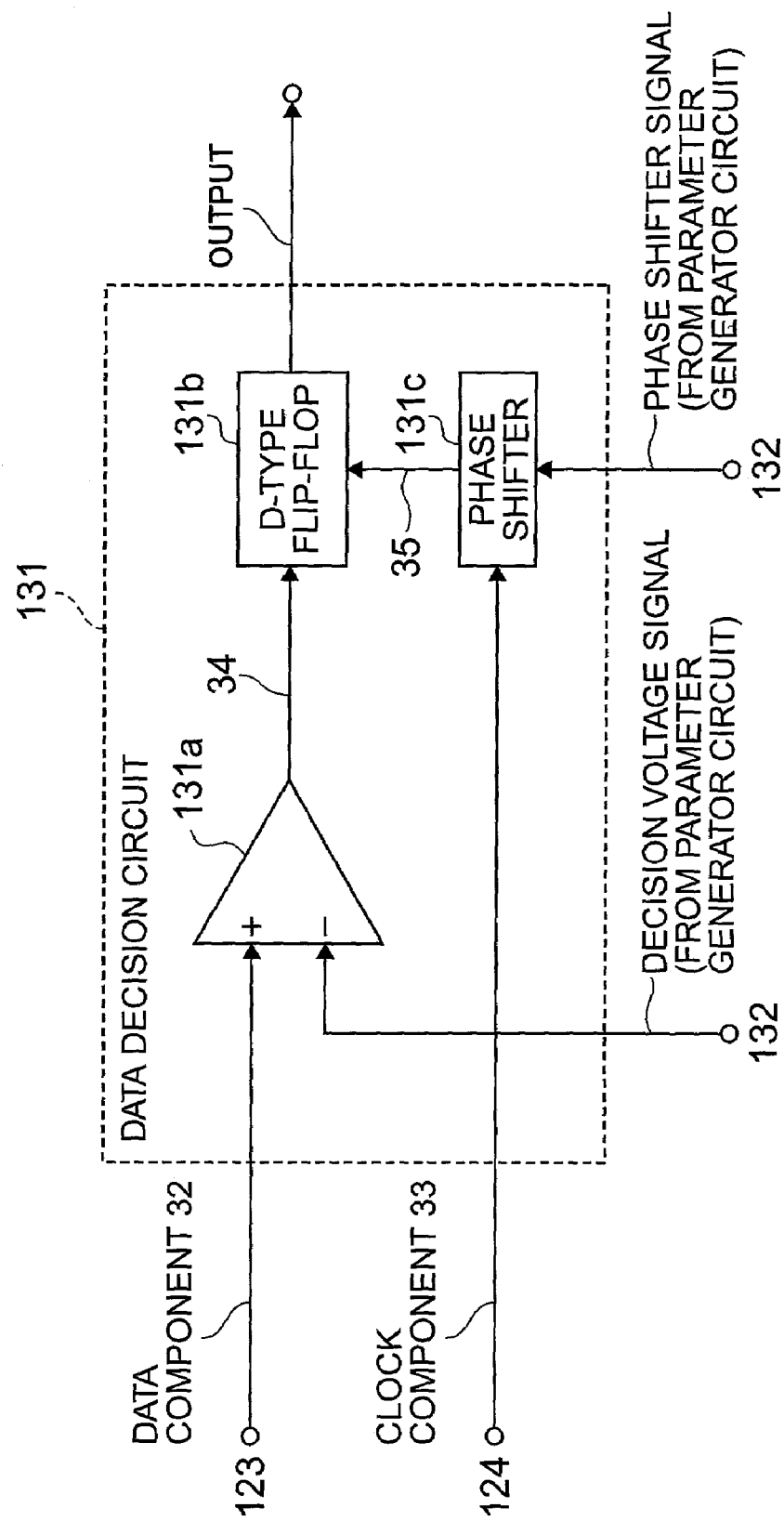

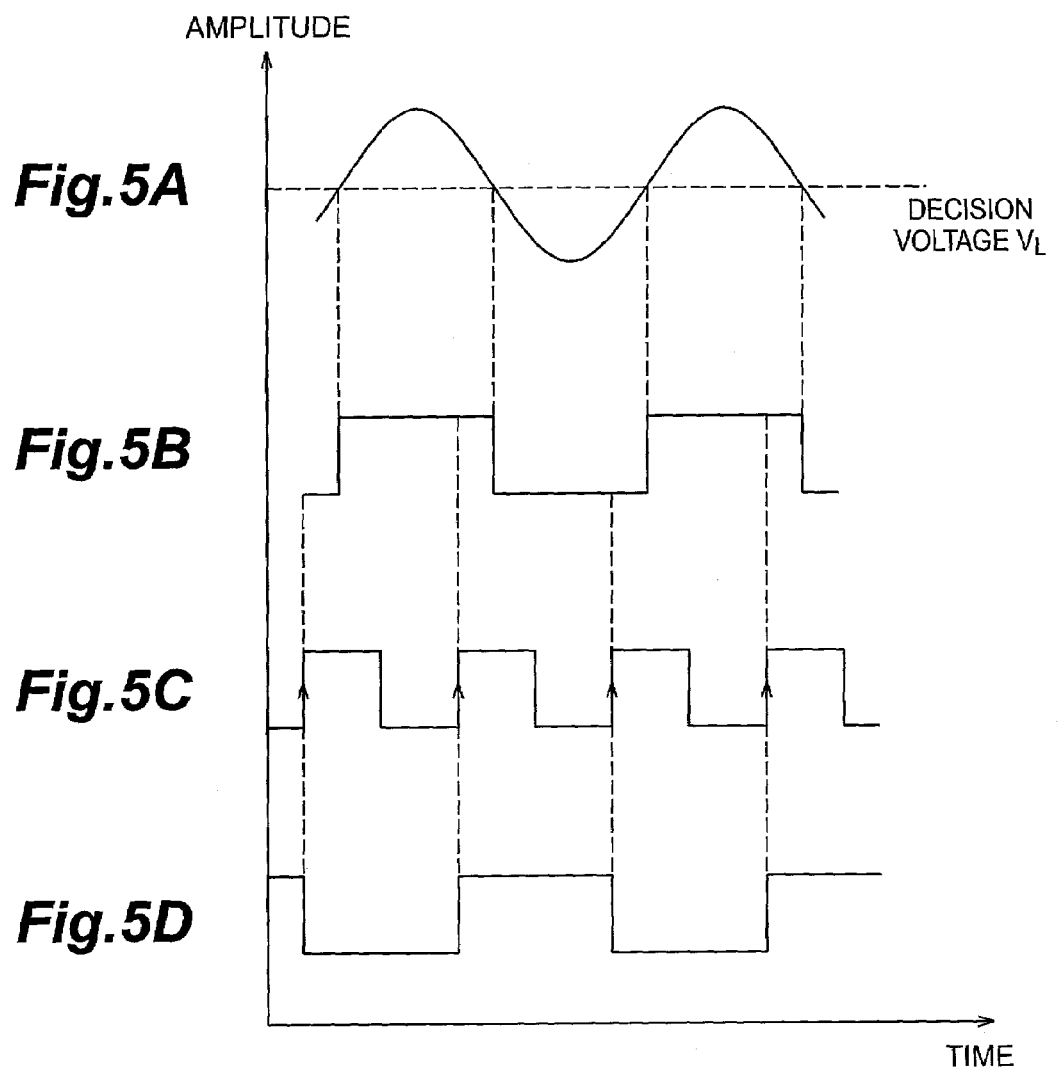

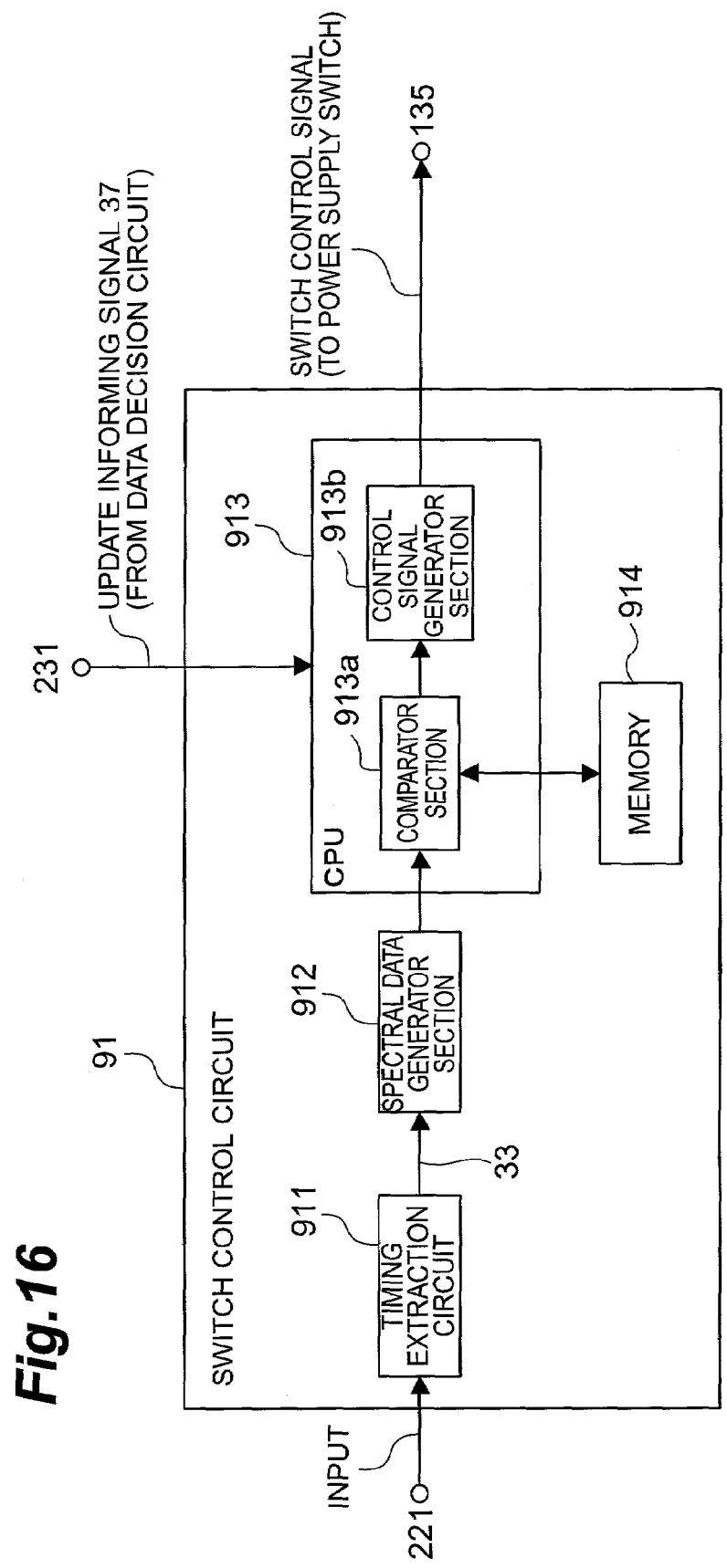

DATA REGENERATOR AND OPTICAL RECEIVER

BACKGROUND OF THE INVENTION

1. Field of the Invention

This invention relates to a data regenerator for regenerating data included in an electric signal from a photoelectric converting section in an optical receiver, and to an optical receiver having the data regenerator.

2. Related Background Art

In recent years, an optical communication system for transmitting an optical signal for a long distance has been developed for practical use. The optical signal consists of a series of pulse. The signal is transmitted using an optical relay device. The relay device includes an optical receiver. The receiver includes a photoelectric converting device. When the receiver receives the optical signal, the signal is converted to an electric signal by the photoelectric converting device. Thereafter, the receiver regenerates pulse data from the electric signal. In the regeneration, a certain decision level is used to discriminate the level of the pulse waveform of the signal. The decision level is not limited to being the central level of the pulse waveform. The decision level changes according to various factors, such as the shape of the pulse waveform and a noise added to the signal.

In an optical communication system, the optimum decision level differs depending on a communication environment. For example, the optimum decision level differs according to a noise generated in the optical relay device or dispersion distortion caused by wavelength dispersion in a long-distance optical fiber. The difference in the decision level is noticeable between the systems for transmitting optical signals over long distances. In order to handle the variety of the decision level, the decision level need to be set manually for every optical communication systems. However, this method requires much expense in time and effort, and does not easily respond to subsequent change in the communication environment.

In order to overcome this problem, technology for enabling an optical receiver itself to set an optimum decision parameter without external control has been investigated. An example of the technology is disclosed in Japanese Patent Laid-open No. HEI 10-13396.

SUMMARY OF THE INVENTION

In an optical communication system including many optical receivers, power consumption of the data regenerator in the optical receiver is important. If the power consumption of the data regenerator is large, then the power consumption for the whole optical communication system will be enormous. Therefore, a data regenerator with low power consumption is desired. The data regenerator that can set the decision parameter corresponding to the communication environment by itself is desired also, as mentioned above.

It is an object of the present invention to provide a data regenerator that can set the decision parameter corresponding to the communication environment with low power consumption.

It is a further object of the present invention to provide an improved optical receiver.

The data regenerator in accordance with the present invention comprises a first data decision circuit, a first signal generator circuit, a decision parameter control circuit, and a power control circuit. The first decision circuit decides data included in an electric input signal using a decision parameter. The first signal generator circuit is coupled to the first decision circuit. The first generator circuit generates a decision parameter signal. The decision parameter signal indicates the decision parameter. The decision parameter control circuit is coupled to the first generator circuit. The parameter control circuit generates a parameter control signal to adjust the decision parameter according to the input signal. The parameter control circuit generates the control signal when receiving operating power. The power control circuit is coupled to the parameter control circuit. The power control circuit controls the power supply to the parameter control circuit according to the input signal. The first generator circuit receives the control signal from the parameter control circuit to generate the parameter signal corresponding to the received control signal and send the parameter signal to the first decision circuit.

Since the power control circuit controls the power supply to the parameter control circuit, the power consumption in the parameter control circuit can be saved. Also, since the data regenerator has the parameter control circuit, the data regenerator is able to adjust the decision parameter by itself without external control.

Controlling the power supply and adjusting the decision parameter are carried out according to the input signal of the data regenerator. The input signal may correspond to the optical communication signal and include information dependent on the communication environment as well as communication data. Therefore, the input signal may be dependent on the communication environment, thus reflecting change in the environment. Consequently, the power control circuit is able to supply the power to the parameter control circuit and adjust the decision parameter in response to the change in the environment.

A signal level can be used as the decision parameter. A phase value can be used as another decision parameter.

The power control circuit may comprise a switch coupled to the parameter control circuit and a switch control circuit coupled to the switch. The switch is coupled to a power source when the power source is connected to the data regenerator so that the switch connects the power source to the data regenerator. The switch control circuit controls the operation of the switch according to information dependent on the communication environment. The environment-dependent information may be a pilot component of the input signal, information giving an estimate of dispersion distortion of the input signal, information indicating the total amount of dispersion of the input signal, eye pattern of the input signal, jitter amount of the input signal, or spectral data of the input data.

The first data decision circuit may be coupled to the power control circuit. In this case, the first data decision circuit may transmit a signal informing update of the decision parameter to the power control circuit. The power control circuit may halt the power supply to the parameter control circuit in response to the update-informing signal.

A further aspect of the invention provides an optical receiver. The optical receiver comprises a plurality of optical receiving units and an optical demultiplexer. The optical demultiplexer is optically coupled to the optical receiving units to send optical signals thereto. These optical signals have different wavelengths. Each of the optical receiving units comprises a photoelectric converter, and a data regenerator in accordance with the invention. The photoelectric converter converts the optical signal to the electric signal. The data regenerator receives the electric signal from the photoelectric converter.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a block diagram of a data decision circuit contained in the receiving unit shown in FIG. 2;

FIGS. 5A–5D show the waveforms of the signals processed by the data decision circuit shown in FIG. 4;

FIG. 16 is a block diagram of the switch control circuit in the third embodiment of the optical receiver in accordance with the present invention.

DESCRIPTION OF THE PREFERRED EMBODIMENTS

Figure 1:
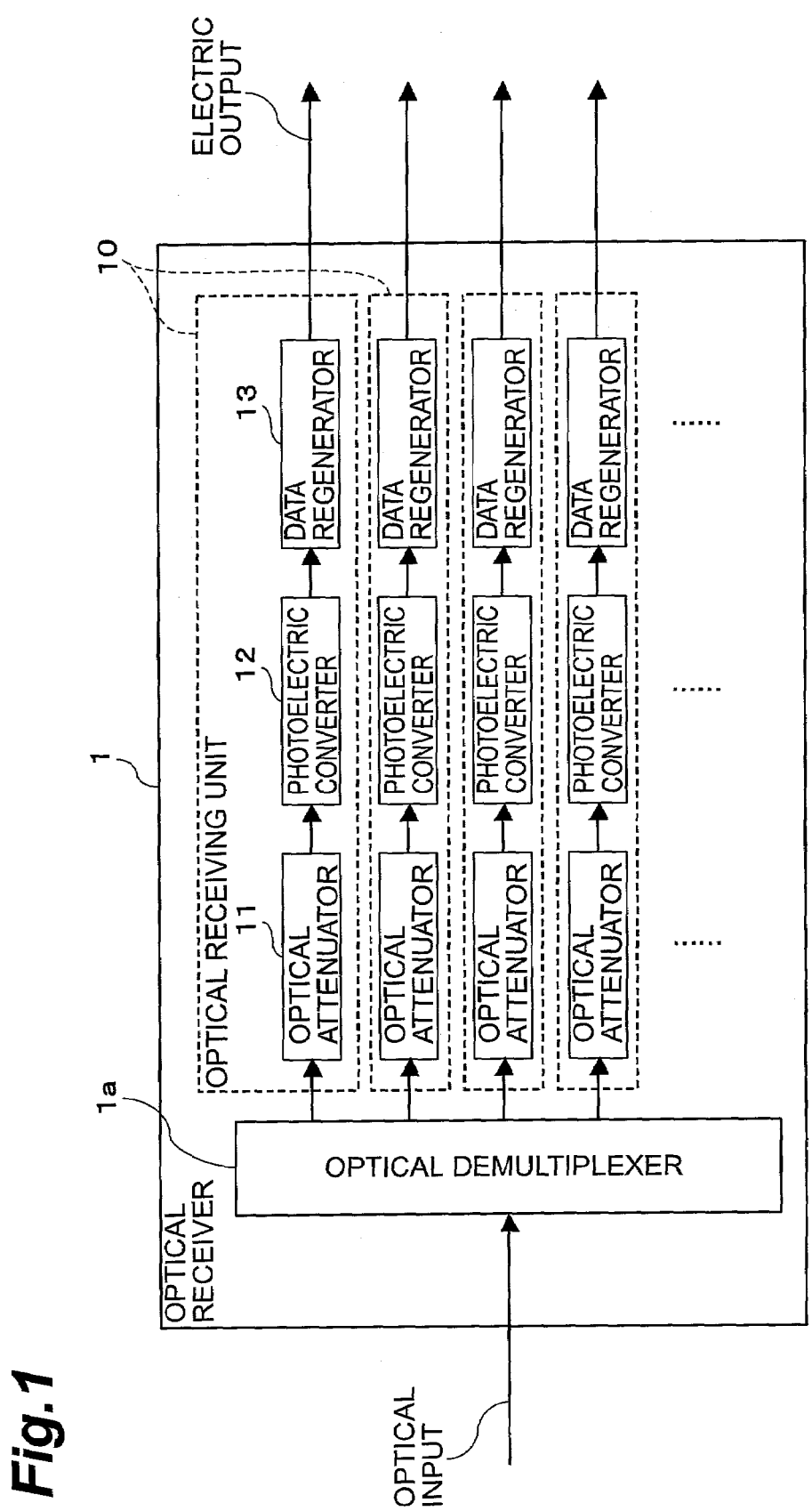
FIG. 1 is a block diagram of the first embodiment of the optical receiver in accordance with the present invention.

In the following, embodiments of the present invention will be explained in detail with reference to the drawings. To facilitate understanding, identical reference numerals are used, where possible, to designate identical elements that are common to the figures without repeating the overlapping descriptions.

First Embodiment

The first embodiment of the optical receiver in accordance with the present invention will now be described. FIG. 1 is a block diagram schematically showing the configuration of an optical receiver according to the first embodiment. The optical receiver receives an optical communication signal at its input and produces a plurality of electric signals at its outputs.

The optical receiver 1 includes an optical demultiplexer circuit 1a and a plurality of optical receiving units 10. The demultiplexer 1a is optically coupled to the receiving units 10. The demultiplexer 1a receives the optical input signal and demultiplexes it into optical signals with different wavelengths. The demultiplexer 1a sends these optical signals to the optical receiving units 10, respectively. The receiving units 10 convert the optical signals to the electric signals and carry out data regeneration. The receiving units 10 generate the electric output signals, which indicate the regenerated data.

Figure 2:
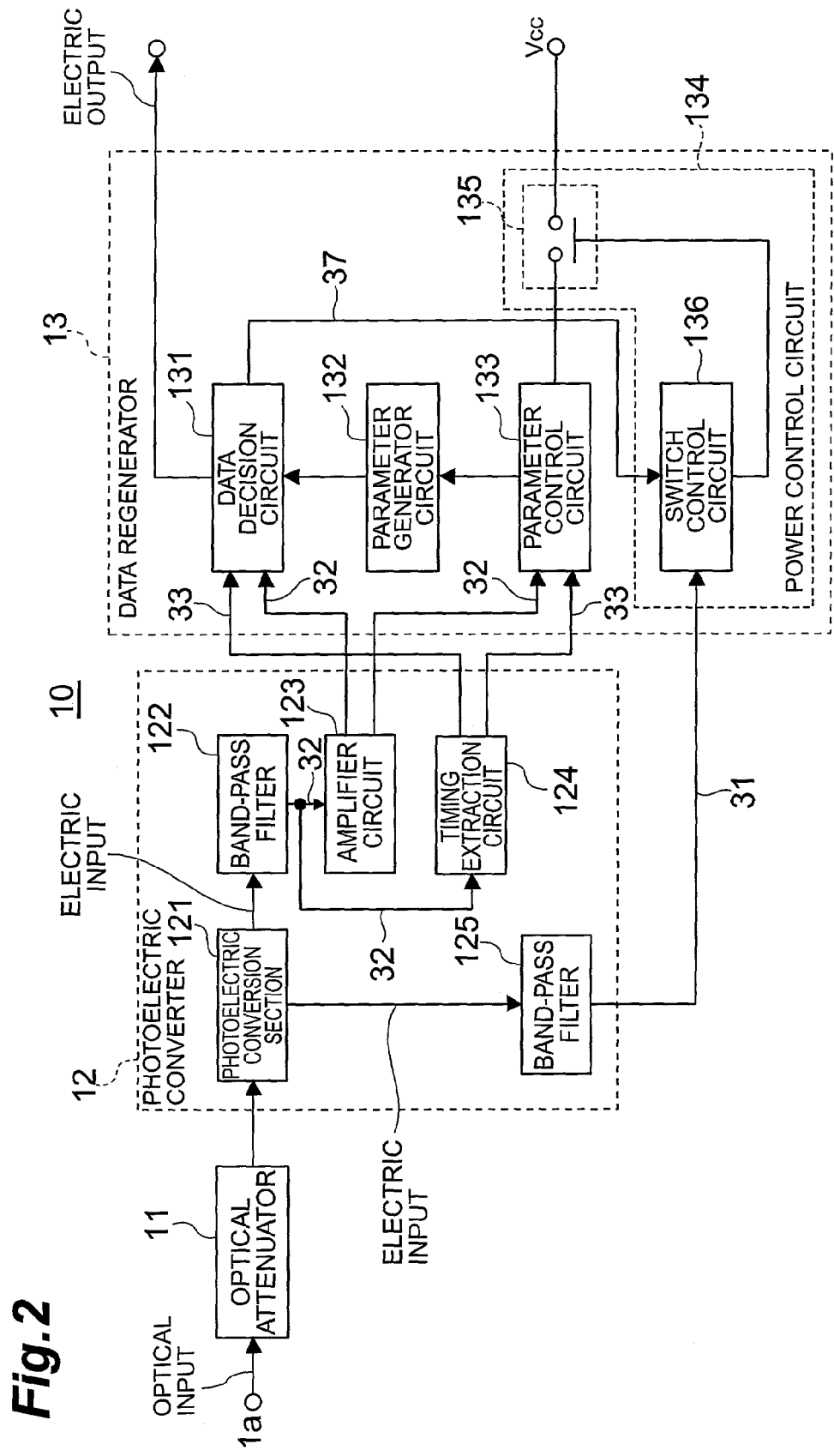
FIG. 2 is a block diagram of an optical receiving unit contained in the receiver shown in FIG. 1.

The optical receiving unit 10 will now be described in detail. FIG. 2 is a block diagram schematically showing the configuration of the receiving unit 10. The receiving unit 10 includes an optical attenuator 11, a photoelectric converter 12, and a data regenerator 13. The attenuator 11 is optically coupled to the demultiplexer 1a. The attenuator 11 receives the optical input communication signal from the demultiplexer 1a and attenuates it. The photoelectric converter 12 is optically coupled to the attenuator 11. The data regenerator 13 is electrically coupled to the photoelectric converter 12.

The photoelectric converter 12 comprises a photoelectric converting section 121 optically connected to the attenuator 11, a band-pass filter 122 electrically coupled to the photoelectric converting section 121, amplifier circuit 123 and timing extraction circuit 124 which are electrically coupled to the band-pass filter 122, and a band-pass filter 125 electrically coupled to the photoelectric converting section 121.

Figure 3A:
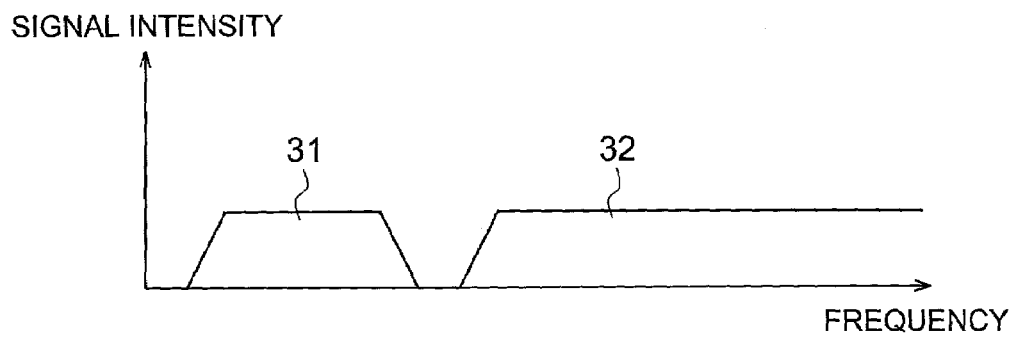
FIGS. 3A and 3B show the frequency spectra of the signals processed by the receiving unit shown in FIG. 2.
Figure 3B:
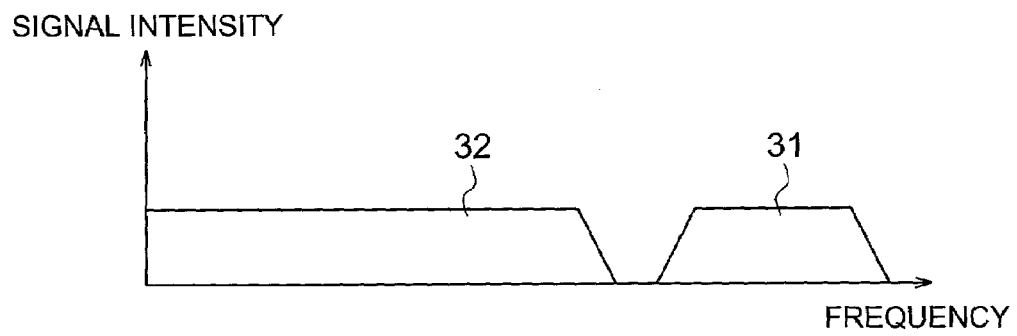

The photoelectric converting section 121 receives the optical signal from the attenuator 11 to convert the optical signal to an electric signal. The electric signal is sent to the band-pass filters 122 and 125. It is supposed that the electric signal includes a pilot component 31, which is a monitoring data component, in addition to a data component 32, as illustrated in FIG. 3A or FIG. 3B. The band-pass filter 122 is adapted to pass the data component 32.

After passing through the band-pass filter 122, the data component 32 is split into two and then sent to the amplifier circuit 123 and timing extraction circuit 124, respectively. The amplifier circuit 123 amplifies the data component 32. The amplified data component 32 is sent to a data decision circuit 131 and parameter control circuit 133 in the data regenerator 13. The timing extraction circuit 124 extracts a clock component 33 from the data component 32. The timing extraction circuit 124 sends the extracted clock component 33 to the data decision circuit 131 and parameter control circuit 133. The timing extraction circuit 124 contains a differential fold-back circuit and induction filter. The clock component 33 is extracted by a non-linear sampling method using the fold-back circuit and induction filter.

The band-pass filter 125 is adapted to pass the pilot component 31 of the electric signal. After passing through the filter 125, the pilot component 31 goes into a power control circuit 134 in the data regenerator 13.

The data regenerator 13 receives electric input signals from the photoelectric converter 12, and carries out data regeneration using decision parameters. The decision parameters include decision voltage $V_L$ and decision phase $\phi_L$. The data regenerator 13 produces an electric data signal indicating the regenerated data at its output.

The data regenerator 13 includes the data decision circuit 131, a decision parameter generator circuit 132, the decision parameter control circuit 133 and the power control circuit 134. The power control circuit 134 includes a power control switch 135 and a switch control circuit 136. The data decision circuit 131 is electrically coupled to the amplifier circuit 123 and timing extraction circuit 124 in the photoelectric converter 12. The data decision circuit 131 is also electrically coupled to the parameter generator circuit 132. The parameter generator circuit 132 is electrically coupled to the parameter control circuit 133 and data decision circuit 131. The parameter control circuit 133 is electrically coupled to the amplifier circuit 123 and timing extraction circuit 124 in the photoelectric converter 12. The parameter control circuit 133 is also electrically coupled to the parameter generator circuit 132. The power control circuit 134 is electrically coupled to the data decision circuit 131 and parameter control circuit 133. The power control circuit 134 is also electrically coupled to the band-pass filter 125 in the photoelectric converter 12.

Referring to FIG. 4, the data decision circuit 131 will now be described. FIG. 4 is a block diagram showing the configuration of the circuit 131. The data decision circuit 131 includes a comparator circuit 131a, a D-type flip-flop 131b, and a phase shifter 131c. The comparator circuit 131a is electrically coupled to the amplifier circuit 123 in the photoelectric converter 12. The comparator circuit 131a is electrically coupled to the D-type flip-flop 131b. The D-type flip-flop 131b is electrically coupled to the comparator circuit 131a and the phase shifter 131c. The phase shifter 131c is electrically coupled to the timing extraction circuit 124 in the photoelectric converter 12.

The comparator circuit 131a receives the data component 32 from the amplifier circuit 123 in the photoelectric converter 12. The comparator circuit 131a detects the data included in the data component 32 using one of the decision parameters, that is, the decision voltage $V_L$, as the reference. The decision voltage $V_L$ is a threshold signal level. The decision voltage $V_L$ is specified by a decision voltage signal. The comparator 131a receives the decision voltage signal from the parameter generator circuit 132.

FIG. 5 shows examples of the waveforms of the electric signals in the data decision circuit 131. The horizontal axis represents time, and the vertical axis represents voltage. When the comparator 131a receives the data component 32 with the waveform shown in FIG. 5A, the comparator 131a detects the data in the data component 32 using the decision voltage $V_L$. As a result, a data signal 34 with the waveform shown in FIG. 5B is produced. The comparator 131a sends the data signal 34 to the flip-flop 131b, which is a sequential circuit.

The phase shifter 131c receives the clock component 33 from the timing extraction circuit 124 in the photoelectric converter 12. The phase shifter 131c also receives a phase shifter signal from the parameter generator circuit 132. The phase shifter 131c adjusts the phase of the clock component 33 according to the phase shifter signal. The phase shifter signal corresponds to the decision phase $\phi_L$. The decision phase $\phi_L$ is a value indicating how much to shift the phase of the clock component 33. The phase shifter 131c shifts the phase of the received clock component 33 by the decision phase $\phi_L$ to generate a clock signal 35. FIG. 5C shows the waveform of the clock signal 35. The phase shifter 131c sends the clock signal 35 to the flip-flop 131b.

The flip-flop 131b latches the data signal 34 (FIG. 5B) on the rising edge of the clock signal 35 (FIG. 5C) The rising edge is indicated with the arrow in FIG. 5C. Consequently, the flip-flop 131d produce a data signal with the waveform shown in FIG. 5D.

Figure 6:
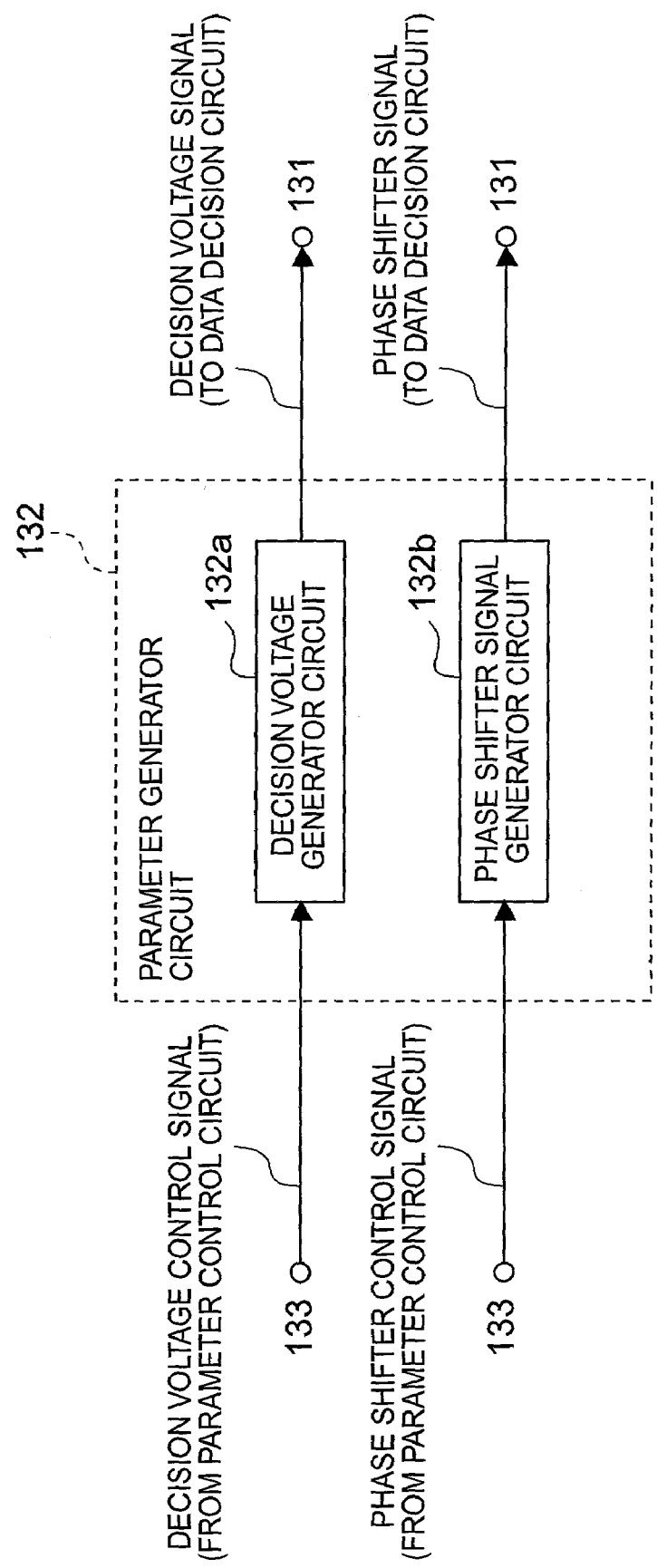
FIG. 6 is a block diagram of a parameter generator circuit contained in the receiving unit in FIG. 2.

Referring to FIG. 6, the parameter generator circuit 132 will now be described. FIG. 6 is a block diagram showing the configuration of the circuit 132. The parameter generator circuit 132 comprises a decision voltage generator circuit 132a and a phase shifter signal generator circuit 132b.

The decision voltage generator 132a receives a decision voltage control signal from the parameter control circuit 133. The generator 132a generates a decision voltage signal in response to the decision voltage control signal. The generator 132a sends the decision voltage signal to the data decision circuit 131. The generator 132a holds the decision voltage control signal that is received most recently, and continuously generates a decision voltage signal corresponding to the held control signal.

The phase shifter signal generator circuit 132b receives a phase shifter control signal from the parameter control circuit 133. The generator 132b generates a phase shifter signal in response to the phase shifter control signal. The generator 132b sends the phase shifter signal to the data decision circuit 131. The generator 132b holds the phase shifter control signal that is received most recently, and continuously generates a phase shifter signal corresponding to the held control signal.

Figure 7:
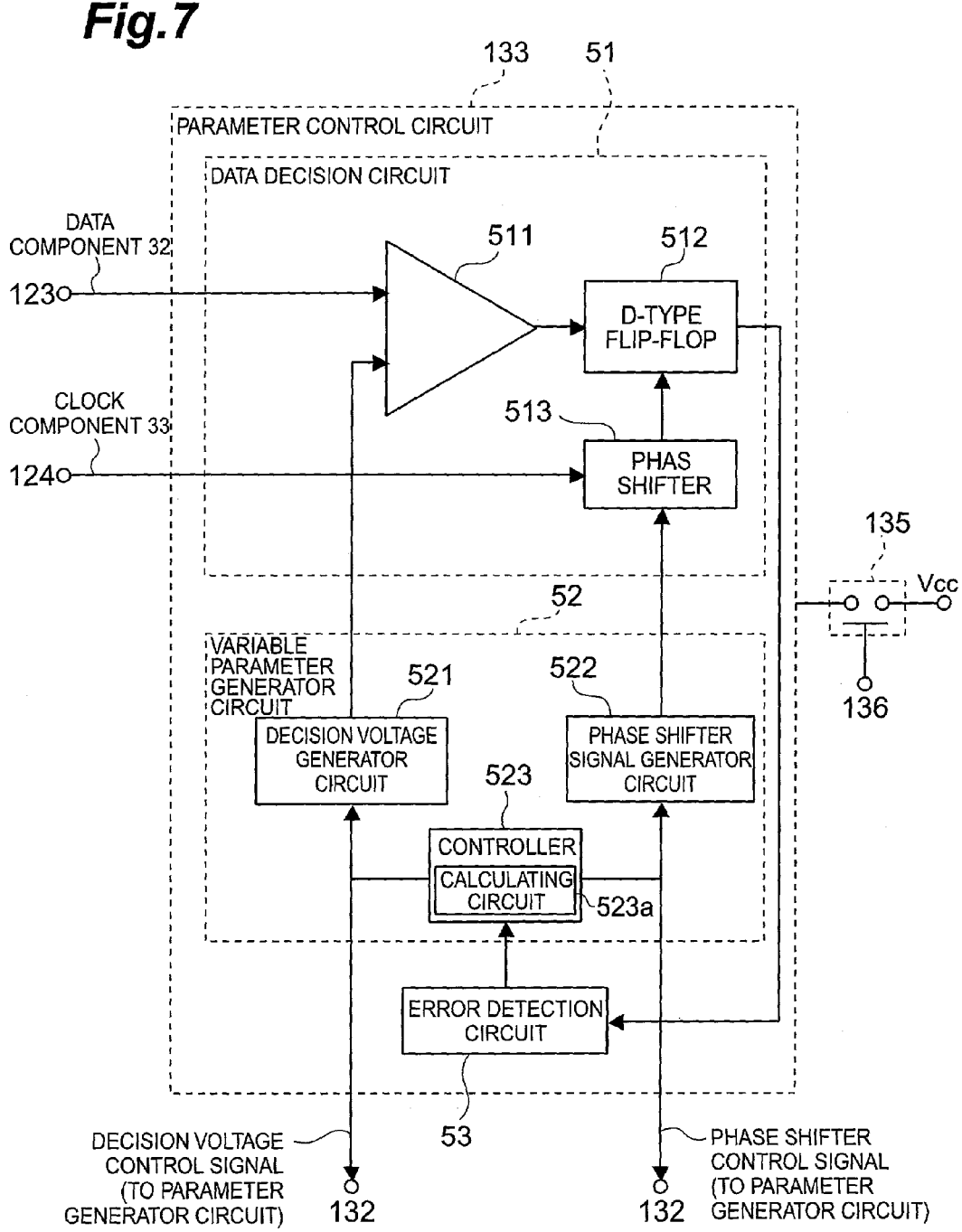
FIG. 7 is a block diagram of a parameter generator circuit contained in the receiving unit shown in FIG. 2.

Referring to FIG. 7, the decision parameter control circuit 133 will now be described. FIG. 7 is a block diagram showing the configuration of the circuit 133. The decision parameter control circuit 133 comprises a data decision circuit 51, a variable decision parameter generator circuit 52, and an error detection circuit 53. Supplying operating power activates the decision parameter control circuit 133. The operating power is supplied to the circuit 133 from an external power source via a power supply switch 135.

The data decision circuit 51 is electrically coupled to the amplifier circuit 123 and timing extraction circuit 124 in the photoelectric converter 12. The circuit 51 is also electrically coupled to the variable parameter generator circuit 52 and error detection circuit 53. The variable parameter generator circuit 52 is electrically coupled to the data decision circuit 51 and the error detection circuit 53.

The data decision circuit 51 receives the data component 32 from the amplifier 123 and decides the data. The decided data is sent to the error detection circuit 53.

The data decision circuit 51 comprises a comparator circuit 511, D-type flip-flop 512, and a phase shifter 513. In this embodiment, the data decision circuit 51 and data decision circuit 131 have a similar configuration. The comparator circuit 511 and comparator circuit 131a are equivalent circuits, as are the D-type flip-flop 512 and D-type flip-flop 131b, and the phase shifter 513 and phase shifter 131c, respectively. However, the invention is not limited to such a configuration.

The error detection circuit 53 determines the bit error rate of the data decided by the data decision circuit 51. An example of a method for determining the bit error rate of the decided data will now be described. In this example, the decided data consists of a header part and a data part. The header part stores bit sum information. The bit sum information indicates the n-bit sum of the data part that is calculated by an optical transmitter (not shown) in the communication system. The error detector 53 determines the n-bit sum of the data part in the decided data. The error detector 53 calculates the exclusive OR of the n-bit sum of the data part and the bit sum information stored in the header part. For example, if the n-bit sum determined by the error detector 53 is "01010001" and the bit sum information stored in the header section is "01010011," then the exclusive OR is "00000010." By using the exclusive OR, the error detector 53 determines an error value indicating the bit error rate. The error detector 53 sends the error value to the variable parameter generator circuit 52.

The variable parameter generator circuit 52 includes a decision voltage generator circuit 521, a phase shifter signal generator circuit 522, and a control section 523. The control section 523 includes a calculating circuit 523a. The control section 523 is electrically coupled to the error detector 53. The control section 523 is also electrically coupled to the decision voltage generator circuit 521 and the phase shifter signal generator circuit 522.

The control section 523 receives the bit error rate from the error detector 53. The calculating circuit 523a in the control section 523 calculates the decision parameters using the received bit error rate. The decision parameters are the decision voltage $V_L$ and the decision phase $\phi_L$, as mentioned above.

Figure 8A:
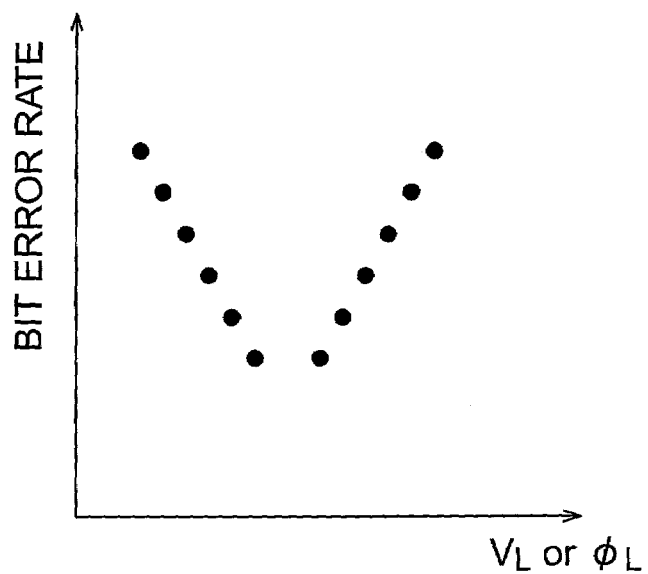
FIGS. 8A and 8B show a method of calculating bit error rate in the parameter control circuit shown in FIG. 7.
Figure 8B:
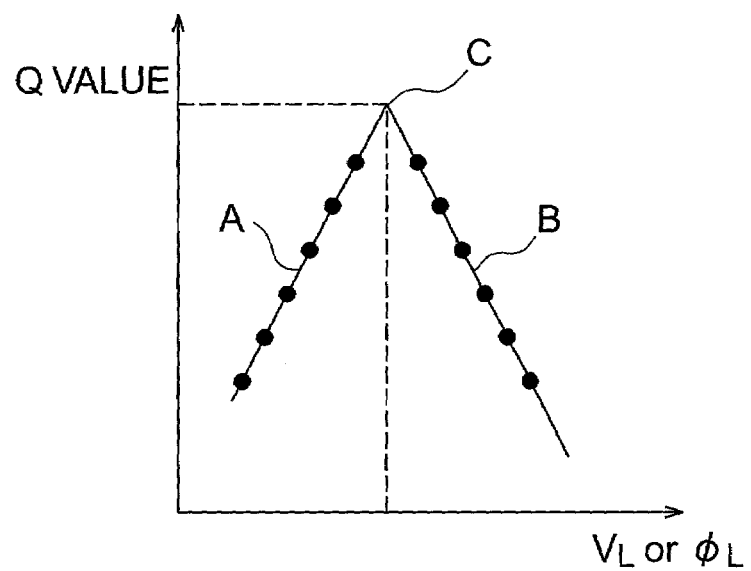

FIG. 8A shows the relationship between the decision parameters and the bit error rate. The decision parameter (decision voltage $V_L$ or decision phase $\phi_L$) are indicated on the horizontal axis, and the bit error rate is indicated on the vertical axis as a logarithmic value. As shown in FIG. 8A, there is a virtually linear correlation between the decision voltage $V_L$ or the decision phase $\phi_L$ and the bit error rate. The graph illustrated in FIG. 8B is obtained by converting the bit error rate using an inverse function of a complementary error function. In FIG. 8B, the intersection C of the two graphs A and B drawn by a least square method indicates the optimum Q value. The decision voltage $V_L$ and decision phase $\phi_L$ corresponding to the Q value are used for the data decision as optimum decision parameters.

The calculating circuit 523a in the control section 523 determines the decision voltage $V_L$ and decision phase $\phi_L$ by the above calculation. The control section 523 sends a decision voltage control signal indicating the decision voltage $V_L$ to the decision voltage generator 521. The control section 523 also sends a shifter control signal indicating the decision phase $\phi_L$ to the phase shifter signal generator 522. Moreover, the control section 523 also sends the decision voltage control signal and phase shifter control signal to the parameter generator 132.

The decision voltage generator 521 has a similar function to the decision voltage generator 132a. The phase shifter signal generator 522 has a similar function to the phase shifter generator 132b. The decision voltage generator 521 receives the decision voltage control signal, generates the decision voltage signal and sends it to the data decision circuit 51. The phase shifter signal generator 522 receives the phase shifter control signal, generates the phase shifter signal and sends it to the data decision circuit 51.

Referring to FIG. 2 again, the power control circuit 134 will now be described. The power control circuit 134 includes the power supply switch 135 and the switch control circuit 136. The switch 135 is electrically coupled to the parameter control circuit 133. When the optical receiver 1 is activated, the switch 135 is connected to the external power source Vcc. In this case, the switch 135 connects the parameter control 133 to the power source. Turning on the switch 135 starts the power supply to the parameter control 133, and turning off the switch 135 halts the power supply. The switch control 136 is electrically coupled to the switch 135 and data decision circuit 131. The switch control 136 is also electrically coupled to the band-pass filter 125 in the photoelectric converter 12.

Figure 9:
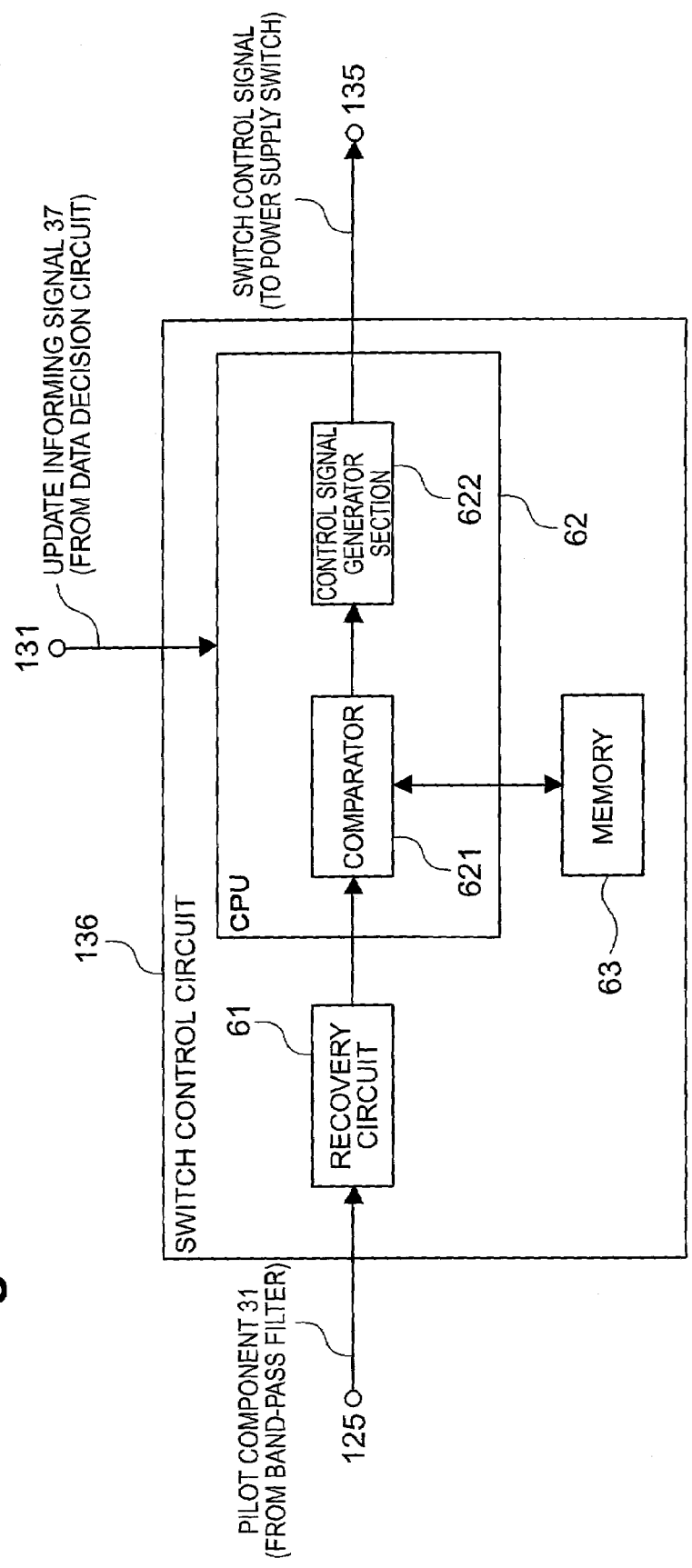
FIG. 9 is a block diagram of an example of a switch control circuit contained in the receiving unit shown in FIG. 2.

The switch control 136 will now be described with reference to FIG. 9. FIG. 9 is a block diagram showing the configuration of the switch control 136. The switch control 136 includes a recovery circuit 61, a CPU 62, and a memory 63. The recovery circuit 61 is electrically coupled to the band-pass filter 125 in the photoelectric converter 12, and to the CPU 62. The CPU 62 is electrically coupled to the recovery circuit 61 and the memory 63, and it is also electrically coupled to the data decision circuit 131 and the power supply switch 135.

The recovery circuit 61 demodulates the pilot component 31 passed by the band-pass filter 125. The recovery circuit 61 sends the demodulated pilot component to the CPU 62. The pilot component may be superposed with information such as the unique ID of the optical transmitter and information giving an estimate of the dispersion distortion (e.g., node-to-node transmission distance, dispersion amount, amount of dispersion compensation in the transmitter, or transmission rate). In this case, the recovery circuit 61 extracts the superposed information, as well as demodulates the pilot component. The recovery circuit 61 sends the extracted superposed information to the CPU 62.

The pilot component and the superposed information are dependent on the communication environment, thus reflecting change in the communication environment. CPU 62 stores these data in the memory 63 under a predetermined condition. This will be described later in detail.

The CPU 62 includes a comparator section 621 and a control signal generator section 622. The comparator section 621 is electrically coupled to the recovery circuit 61 and the memory 63, and is also electrically coupled to the control signal generator section 622. The generator section 622 is electrically coupled to the comparator section 621 and is also electrically coupled to the switch 135.

The switch control circuit 136 controls the operation of the switch 135, and therefore the power supply to the parameter control 133, according to change in the pilot component 31 and the dispersion-distortion-estimate information. For such a control, the comparator section 621 compares the pilot component and dispersion-distortion-estimate information transmitted from the recovery circuit 61 with those stored in the memory 63. The comparator 621 determines whether or not to store the new data in the memory 63 according to the result of the comparison. It will be described in the following more specifically.

If the difference between the data from the recovery circuit 61 and the data in the memory 63 is in a predetermined range, then the process in the comparator section 621 is finished and the data in the memory 63 remain as they are. If, on the other hand, the difference between the both data exceeds the predetermined range, then the comparator section 621 stores the data from the recovery circuit 61 in the memory 63. The pilot component and dispersion-distortion-estimate information in the memory 63 are updated in this way. In other words, if the communication environment has changed beyond a predetermined limit, then new pilot component and dispersion-distortion-estimate information are stored in the memory 63. This is because the pilot component and dispersion-distortion-estimate information reflect the communication environment.

The storing action for the pilot component and dispersion-distortion-estimate information is performed at a predetermined timing. In response to the storing action, the control signal generator section 622 generates and sends a switch-on signal to the switch 135. The switch-on signal is a switch control signal for closing the switch 135.

Figure 10:
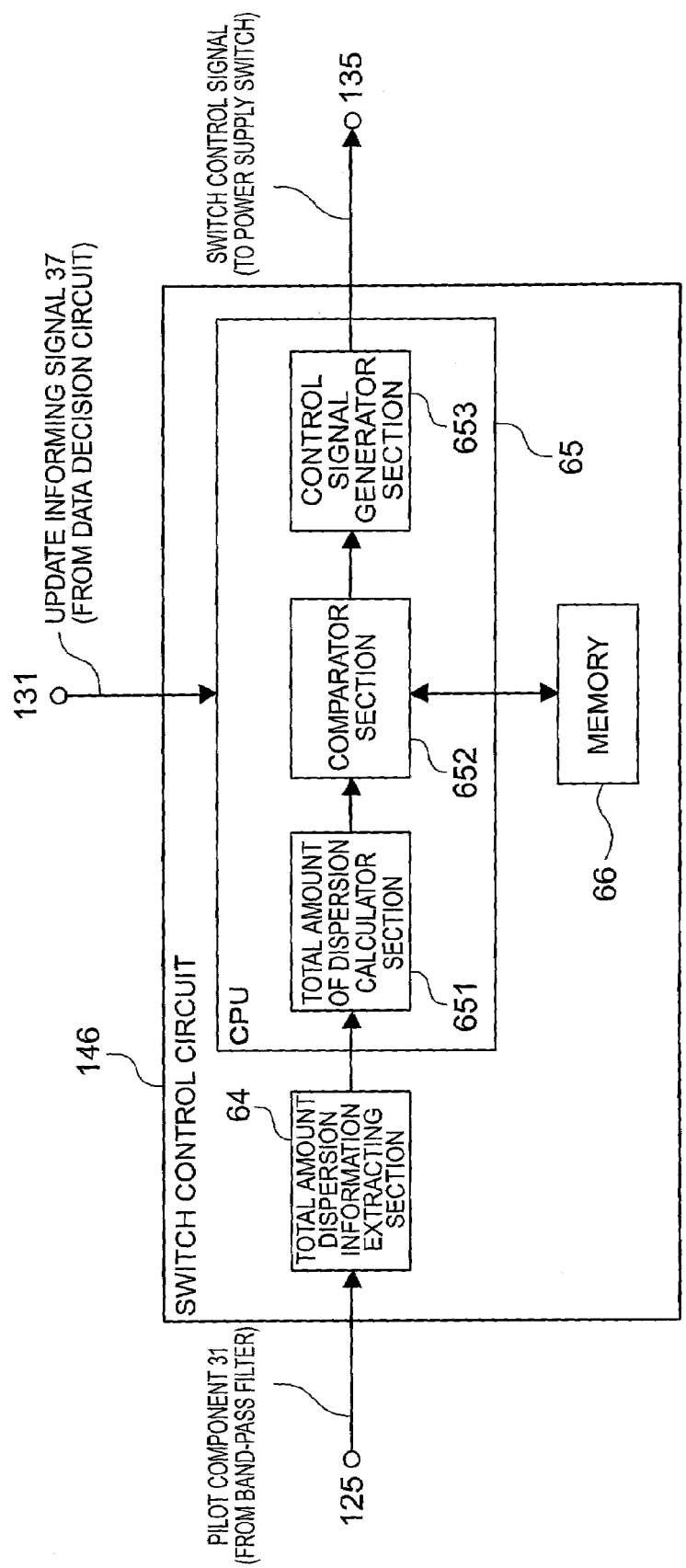
FIG. 10 is a block diagram of another example of the switch control circuit.

In this embodiment, it is possible to use a switch control circuit 146 shown in FIG. 10, instead of the switch control circuit 136. FIG. 10 is a block diagram showing the configuration of the switch control 146. The switch control circuit 146 includes a section 64 for extracting information of the total dispersion amount, a CPU 65, and a memory 66. The information extractor section 64 is electrically coupled to the band-pass filter 125 in the photoelectric converter 12, and is also electrically coupled to the CPU 65. The CPU 65 is electrically coupled to the information extractor section 64 and the memory 66, and is also electrically coupled to the data regenerator circuit 131 and the switch 135.

The information extractor section 64 demodulates the pilot component 31 passed by the band-pass filter 125. The extractor section 64 also extracts information indicating the total amount of the dispersion (for example, node-to-node transmission distance, amount of dispersion, or amount of dispersion compensation in the transmitter) from the pilot component 31 and sends the information to the CPU 65. CPU 65 calculates the total dispersion amount using the information and stores the amount in the memory 66 under a condition. The condition will be described later.

The CPU 65 includes a section 651 for calculating the total dispersion amount, a comparator section 652, and a control signal generator section 653. The calculator section 651 is electrically coupled to the information extractor section 64 and the comparator section 652. The comparator section 652 is electrically coupled to the calculator section 651 and memory 66, and is also electrically coupled to the control signal generator section 653. The control signal generator section 653 is electrically coupled to the comparator section 652 and is also electrically coupled to the switch 135.

The calculator section 651 receives the information indicating the total dispersion amount from the information extractor section 64. The calculator section 651 uses the received information to calculate the total dispersion amount. The calculator section 651 sends the calculated total dispersion amount to the comparator section 652.

The switch control circuit 146 controls the operation of the switch 135 according to the change in the total dispersion amount information. For such a control, the comparator section 651 compares the total dispersion amount calculated by the calculator section 651 with the total dispersion amount stored in the memory 66. The comparator 651 determines whether or not to store the new total dispersion amount in the memory 66 according to the result of the comparison. It will be described in the following more specifically.

If the difference between the newly estimated total dispersion amount and the total dispersion amount in the memory 66 is in a predetermined range, then the process in the comparator section 651 is finished and the total dispersion amount in the memory 66 remains as it is. If, on the other hand, the difference between the both data exceeds the predetermined range, then the comparator section 651 stores the newly estimated total dispersion amount in the memory 66. The total dispersion amount in the memory 66 is updated in this way. In other words, if the communication environment has changed beyond a predetermined limit, then the new total dispersion amount is stored in the memory 66. This is because the total dispersion amount reflects the communication environment.

The storing action for the total dispersion amount is performed at a predetermined timing. In response to the storing action, the control signal generator section 653 generates and sends the switch-on signal to the switch 135.

Referring to FIG. 2 again, the operation of the receiving unit 10 and a method for setting the decision parameters in the data regenerator 13 will now be described. In the initial state, a certain decision voltage signal and phase shifter signal are held by the parameter generator 132. These signals are supplied to the data decision circuit 131. In the initial state, the switch 135 is open and no power is supplied to the parameter control circuit 133 from the power source.

The optical input signal is attenuated by the attenuator 11, and then sent to the photoelectric converter 12. The optical input signal is converted to an electric signal by the photoelectric converting section 121 of the photoelectric converter 12. The electric signal is split in two and supplied to the band-pass filters 122 and 125. The electric signal includes the pilot component 31 and the data component 32. The pilot components 31 is superposed with information such as the unique ID of the transmitter, the node-to-node transmission distance, the amount of dispersion, the amount of dispersion compensation in the transmitter, and the transmission rate. After passing through the band-pass filter 122, the data component 32 is split in two and supplied to the amplifier 123 and timing extractor 124.

The data component 32 supplied to the amplifier 123 is amplified, and then branched in two and supplied to the data decision circuit 131 and parameter control circuit 133. The clock component 33 is extracted from the data component 32 in the timing extractor 124. The clock component 33 is supplied to the data decision circuit 131 and parameter control circuit 133. The pilot component 31 passes through the band-pass filter 125 and then enters the switch control circuit 136.

If the quality of the optical input signal changes according to the change in the communication environment such as change in the transmission path of the optical input signal, the quality of the electric signal in the data regenerator 13 also changes accordingly. The data component 32 and pilot component 31 of the electric signal are supplied to the data decision circuit 131 and switch control circuit 136, respectively. The recovery circuit 61 in the switch control 136 extracts the dispersion-distortion-estimate information from the pilot component 31. The regenerator circuit 61 sends the pilot component and the dispersion-distortion-estimate information to the CPU 62. The comparator section 621 of the CPU 62 compares the received pilot component and estimate information with the pilot component and estimate information stored in the memory 63. By this comparison, the CPU 62 determines whether or not the communication environment has changed.

Thus, it is determined, based on the change in the pilot component and dispersion-distortion-estimate information, whether or not the communication environment has changed beyond the predetermined limit. If it is determined that the environment has changed beyond the limit, then the comparator section 621 of the CPU 62 stores the received pilot component and dispersion-distortion-estimate information in the memory 63. Also, the control signal generator section 622 of the CPU 62 sends the switch-on signal to the power supply switch 135.

If the switch control circuit 146 is used in place of the switch control circuit 136, the information extractor section 64 of the circuit 146 extracts the information indicating the total amount of the dispersion from the pilot component 31, and sends the information to the CPU 65. The calculator section 651 of the CPU 65 calculates the total dispersion amount based on the received information.

The total dispersion amount is determined by the transmission distance, the amount of dispersion and the amount of dispersion compensation. More specifically, the total dispersion amount is given by (transmission distance)× (amount of dispersion per unit length of transmission path)− (amount of dispersion compensation). Information relating to the transmission distance, amount of dispersion and amount of dispersion compensation is included in the pilot component.

The calculating section 65 sends the calculated total dispersion amount to the comparator section 652. The comparator section 652 compares the received total amount with the total amount stored in the memory 66, and determines whether or not the dispersion distortion has changed. For example, if the difference between the received total amount and the stored total amount is greater than a predetermined threshold, then the comparator section 652 determines that the dispersion distortion has changed. The dispersion distortion can be estimated from the total dispersion amount when, for example, the transmission path has changed while using the same optical transmitter. In such a case, the total dispersion amount changes in response to the change in the transmission path.

Thus, it is determined, based on the change in the total dispersion amount, whether or not the communication environment has changed beyond the predetermined limit. If it is determined that the environment has changed beyond the limit, then the comparator section 651 of the CPU 65 stores the received total amount in the memory 66. Also, the control signal generator section 653 of the CPU 65 sends the switch-on signal to the switch 135.

When the switch 135 receives the switch-on signal, the switch 135 closes. As a result, the operating power begins to be supplied to the parameter control circuit 133. Therefore, the parameter control 133 begins to operate only when it is determined that the communication environment has changed.

When the power is supplied, the data decision circuit 51 in the parameter control 133 receives the electric input signal and decides the data in the signal. The data decision circuit 51 sends the decided data to the error detector 53. The error detector 53 calculates the bit error rate of the decided data. The error detector 53 sends the bit error rate to the variable parameter generator 52.

As described above, when the variable parameter generator 52 receives the bit error rate, the control section 523 of the generator 52 extracts the optimum Q value using the current decision voltage $V_L$ and decision phase $\phi_L$. The control section 523 determines a new decision voltage $V_L$ and a new decision phase $\phi_L$ corresponding to the calculated Q value. Thus, the decision parameters are updated.

The control section 523 sends the decision voltage control signal corresponding to the updated decision voltage $V_L$ to the decision voltage generators 521 and 132a. The decision voltage control signal instructs the generators 521 and 132a to generate the decision voltage signal of the updated decision voltage $V_L$. The control section 523 also sends a phase shifter control signal corresponding to the updated decision phase $\phi_L$ to the phase shifter signal generators 522 and 132b. The phase shifter control signal instructs the generators 522 and 132b to generate the phase shifter signal of the updated decision phase $\phi_L$.

When the decision voltage generator 521 receives the decision voltage control signal, the generator 521 generates the decision voltage signal according to this control signal. The decision voltage signal has a signal level corresponding to the updated decision voltage $V_L$. The generator 521 sends the decision voltage signal to the comparator 511.

When the phase shifter signal generator 522 receives the phase shifter control signal, the generator 522 generates the phase shifter signal according to this control signal. The generator 522 sends the phase shifter signal to the phase shifter 513. The phase shifter signal informs the phase shifter 513 of the updated decision phase $\phi_L$.

When the decision voltage generator 132a receives the decision voltage control signal, the generator 132a generates the decision voltage signal according to this control signal. The decision voltage signal is the same as that generated in the variable parameter generator 52. The generator 132a sends the decision voltage signal to the comparator 131a.

When the phase shifter signal generator 132b in the parameter generator 132 receives the phase shifter control signal, the generator 132b generates the phase shifter signal according to this control signal. The phase shifter signal is the same as that generated in the variable parameter generator 52. The generator 132b sends the phase shifter signal to the phase shifter 131c.

When the data decision circuit 131 receives the decision voltage signal and the phase shifter signal, the circuit 131 decides the data in the data component 32 using the decision voltage $V_L$ and the decision phase $\phi_L$. The circuit 131 outputs the decided data as an electric signal.

Also, the data decision circuit 131 sends an update-informing signal 37 to the switch control 136 when the circuit 131 receives the updated decision voltage signal and phase shifter signal. The update-informing signal 37 informs the switch control 136 that the decision parameters, i.e., the decision voltage $V_L$ and the decision phase $\phi_L$, have been updated. The switch control 136 sends a switch-off signal to the switch 135 in response to the update-informing signal 37. The switch-off signal is a switch control signal for opening the switch 135. When the switch 135 receives the switch-off signal, the switch 135 opens. As a result, the power supply to the parameter control 133 is reduced or halted.

The merits of the first embodiment will now be described. As described above, only when it is determined that the communication environment has changed, the switch 135 is turned on, and thereby the power is supplied to the parameter control 133 and the decision parameters are updated. When updating the decision parameters has been completed, the switch 135 is turned off, and the power supply to the parameter control 133 is reduced or halted. Since the power is supplied to the parameter control 133 only when it is necessary to update the parameters, the power consumption is reduced.

By contrast, in the prior art disclosed in Japanese Patent Laid-open No. HEI 10-13396, two data decision circuits are continuously activated in the data regenerator to regenerate data in an input signal. Therefore, the power consumption of the data regenerator is large. If an optical communication system consists of a plurality of optical receivers including such data regenerators, the large power consumption of the data regenerators will be a serious problem.

Another merit of the embodiment is that the data regenerator itself can adjust the decision parameters without external control. It is because the data regenerator has the parameter control circuit that updates the parameters according to the change in the communication environment. It can be determined, based on the information dependent on the communication environment, whether or not the update of the parameters is necessary. The environment dependent information is included in the input signal. The pilot component, dispersion distortion estimate information, and/or total amount of dispersion may be used as the environment dependent information.

Second Embodiment

The second embodiment of the optical receiver in accordance with the present invention will now be described. The optical receiver according to the second embodiment is obtained by substituting the optical receiver 10 of the optical receiver 1 according to the first embodiment (FIG. 1) with an optical receiver 20 shown in FIG. 11. Apart from this, the configuration of the optical receiver in accordance with the second embodiment is the same as that of the optical receiver 1.

Figure 11:
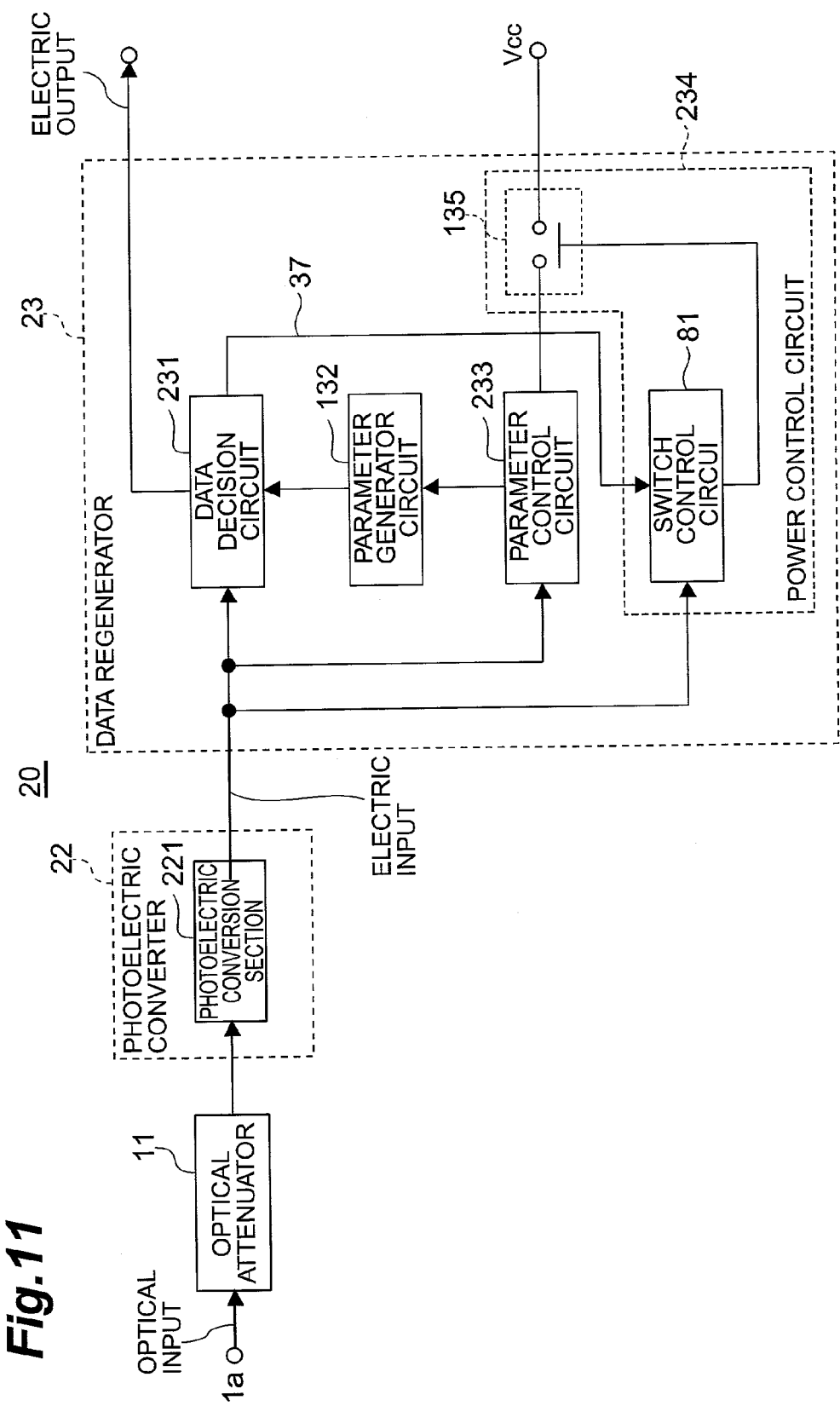
FIG. 11 is a block diagram of the optical receiving unit in the second embodiment of the optical receiver in accordance with the present invention.

The optical receiver 20 will now be described with reference to FIG. 11. FIG. 11 is a block diagram showing the configuration of the optical receiver 20. The receiver 20 includes the optical attenuator 11 which is electrically coupled to the optical demultiplexer 1a, an photoelectric converter 22 which is electrically coupled to the attenuator 11, and a data regenerator 23 which is electrically coupled to the photoelectric converter 22.

The photoelectric converter 22 comprises an photoelectric conversion section 221 which is optical connected to the attenuator 11. The photoelectric conversion section 221 is electrically coupled to a data decision circuit 231, parameter control circuit 233, and power control circuit 234 in the data regenerator 23. The photoelectric conversion section 221 receives an optical input signal from the attenuator 11 and converts the optical signal to an electric signal. The electric signal is branched into three and supplied to the data decision circuit 231, parameter control 233 and power control 234.

The data regenerator 23 includes the data decision circuit 231, decision parameter generator circuit 132, decision parameter control circuit 233, and power control circuit 234. The power control 234 includes the power control switch 135 and a switch control circuit 81. The data decision circuit 231 is electrically coupled to the photoelectric conversion section 221 of the photoelectric converter 22, and is also electrically coupled to the parameter generator 132. The parameter generator 132 is electrically coupled to the parameter control 233 and data decision circuit 231. The parameter control 233 is electrically coupled to the photoelectric conversion section 221 and also to the parameter generator 132. The power control 234 is electrically coupled to the photoelectric conversion section 221 and also to the data decision circuit 231 and parameter control 233.

When the data regenerator 23 receives the electric signal from the photoelectric converter 22, the data regenerator 23 carries out data regeneration using the decision parameters, that is, the decision voltage $V_L$ and decision phase $\phi_L$. The data regenerator 23 outputs an electric signal including the regenerated data.

Figure 12:
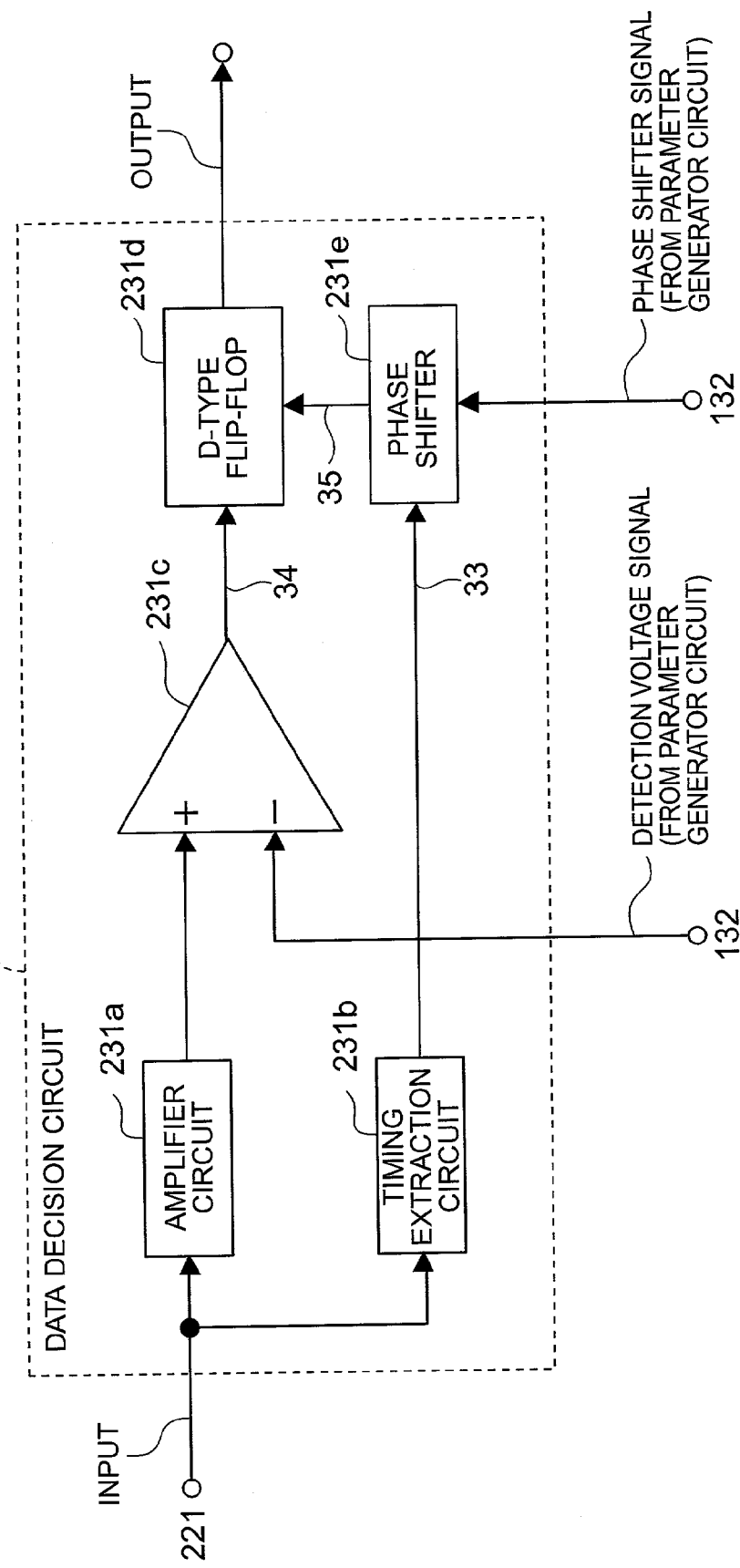
FIG. 12 is a block diagram of the data decision circuit contained in the receiving unit shown in FIG. 11.

The data decision circuit 231 will now be described with reference to FIG. 12. FIG. 12 is a block diagram showing the configuration of the circuit 231. The data decision circuit 231 includes an amplifier circuit 231a, a timing extraction circuit 231b, a comparator circuit 231c, a D-type flip-flop 231d and a phase shifter 231e. The amplifier 231a is electrically coupled to the photoelectric conversion section 221 of the photoelectric converter 22. The timing extractor 231b is electrically coupled to the photoelectric conversion section 221. The comparator circuit 231c is electrically coupled to the amplifier 231a. The comparator circuit 231c is also electrically coupled to the D-type flip-flop 231d. The D-type flip-flop 231d is electrically coupled to the comparator 231c and phase shifter 231e. The phase shifter 231e is electrically coupled to the timing extractor 231b.

The amplifier 231a amplifies the electric input signal and sends the amplified signal to the comparator 231c. The timing extractor 231b extracts the clock component 33 from the input signal and sends the clock component 33 to the phase shifter 231e. The timing extractor 231b includes a differential fold-back circuit and induction filter. The extraction of the clock component 33 is carried out by a non-linear sampling method using the fold-back circuit and induction filter. The comparator 231c and the above comparator 131a act similarly, as do the D-type flip-flop 231d and the above D-type flip-flop 131b, the phase shifter 231e and the above phase shifter 131c, respectively.

Figure 13:
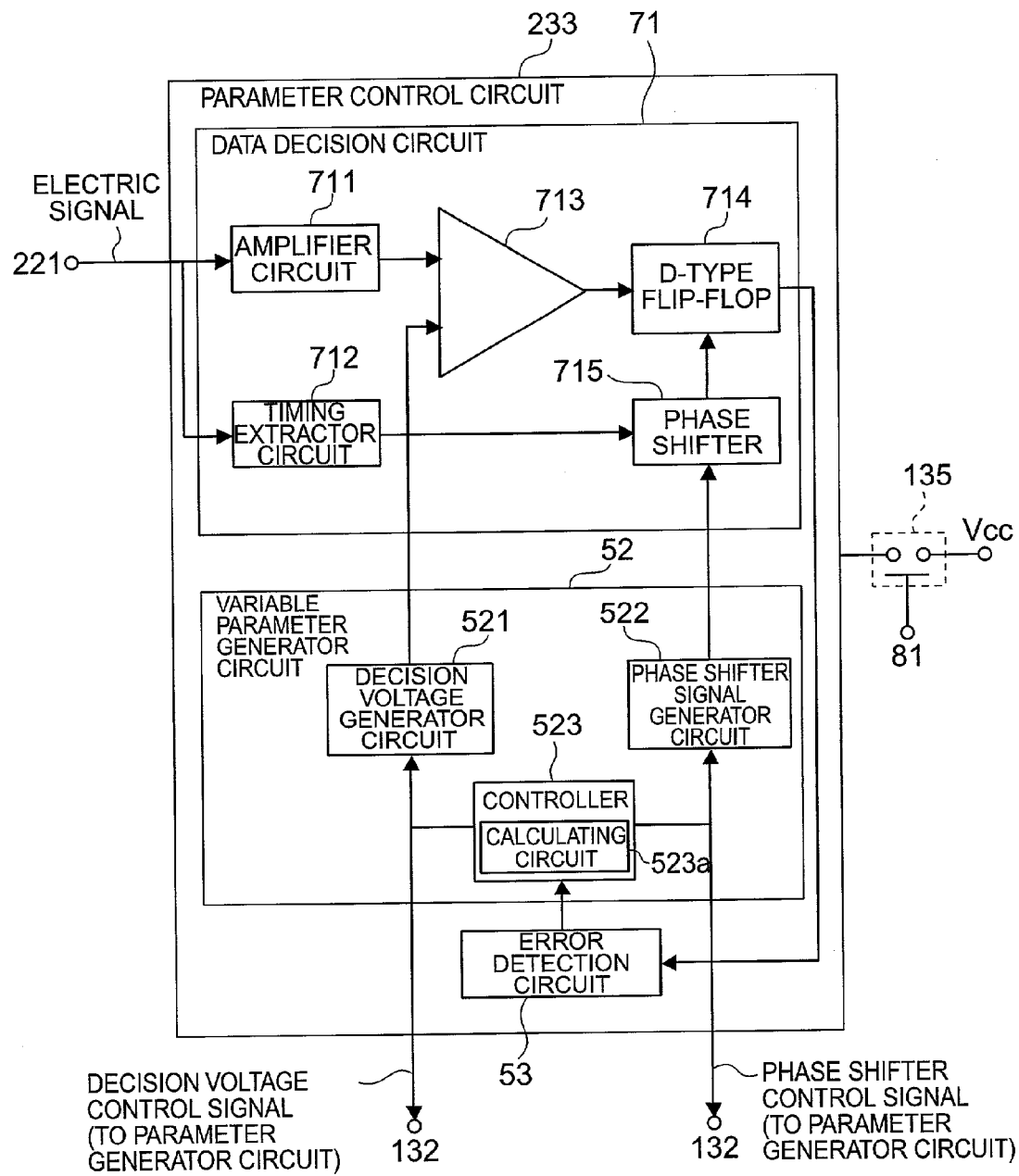
FIG. 13 is a block diagram of the parameter control circuit contained in the receiving unit shown in FIG. 11.

The parameter control circuit 233 will now be described with reference to FIG. 13. FIG. 13 is a block diagram showing the configuration of the circuit 233. The parameter control 233 comprises a data decision circuit 71, a variable parameter generator circuit 52 and an error detection circuit 53. Operating power is supplied to the circuit 233 via the power supply switch 135. The data decision circuit 71 is electrically coupled to the photoelectric conversion section 221 of the photoelectric converter 21 and also electrically coupled to both the variable parameter generator 52 and the error detector 53. The variable parameter generator 52 is electrically coupled to the data decision circuit 71 and the error detector 53.

The data decision circuit 71 comprises an amplifier circuit 711, a timing extraction circuit 712, comparator circuit 713, a D-type flip-flop 714, and a phase shifter 715. In this embodiment, the data decision circuit 71 and the above data decision circuit 231 have the same configuration. However, the invention is not limited to such a configuration.

Referring to FIG. 11 again, the power control circuit 234 will now be described. The power control 234 comprises the power supply switch 135 and switch control circuit 81. The switch 135 is electrically coupled to the parameter control 233. When the optical receiver in accordance with this embodiment is activated, the switch 135 is connected to the external power source Vcc. In this case, the switch 135 connects the parameter control 233 to the power source. Turning on the switch 135 starts the power supply to the parameter control 233, and turning off the switch 135 halts the power supply. The switch control 81 is electrically coupled to the switch 135 and data decision circuit 231. The switch control 81 is also electrically coupled to the photoelectric conversion section 221 of the photoelectric converter 22.

Figure 14:
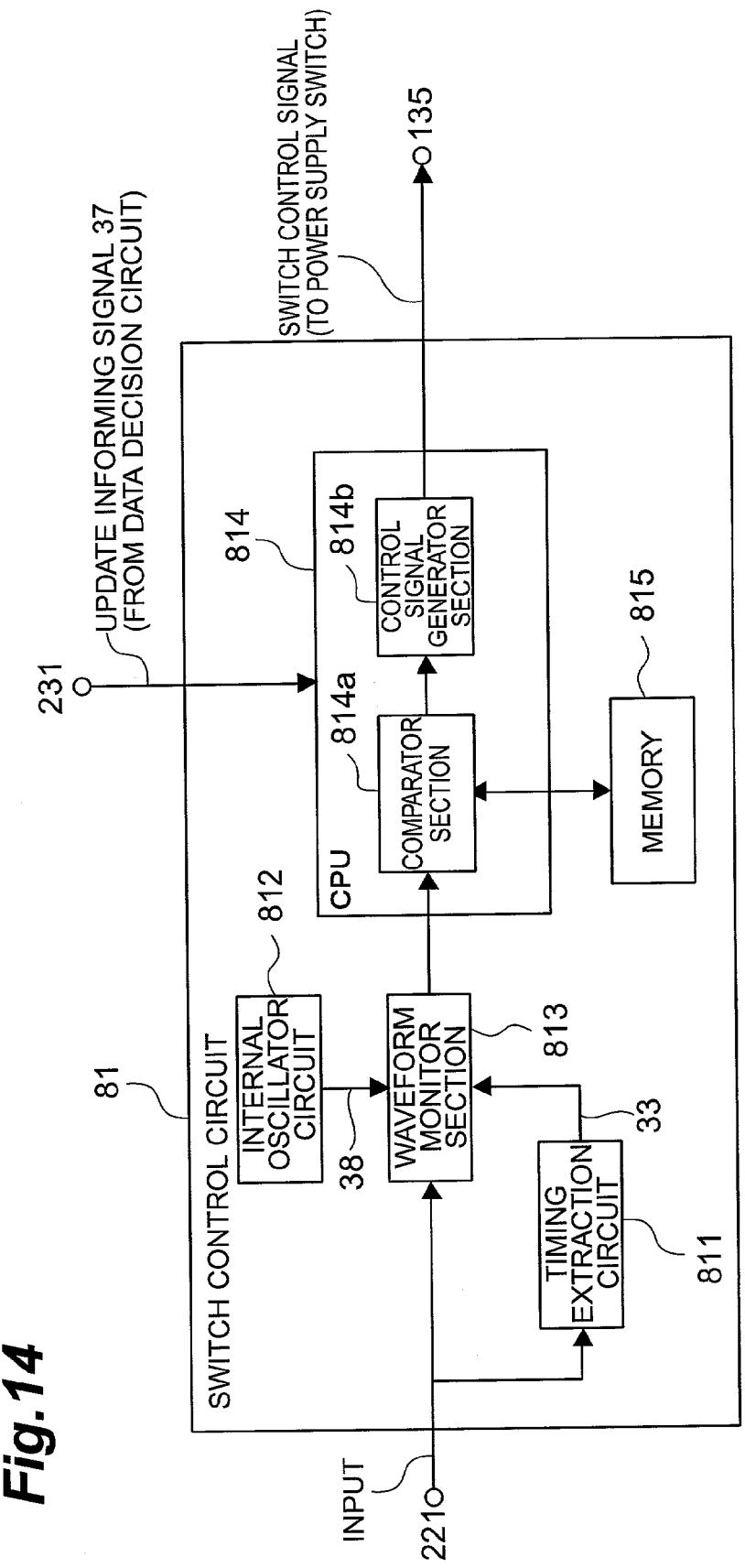
FIG. 14 is a block diagram of the switch control circuit contained in the receiving unit shown in FIG. 11.

The switch control circuit 81 will now be described with reference to FIG. 14. FIG. 14 is a block diagram showing the configuration of the circuit 81. The switch control 81 includes a timing extraction circuit 811, an internal oscillator circuit 812, a waveform monitor section 813, a CPU 814 and a memory 815. The timing extractor 811 is electrically coupled to the photoelectric conversion section 221 of the photoelectric converter 22, and also to the waveform monitor 813. The waveform monitor 813 is electrically coupled to the photoelectric conversion section 221, and also to both the timing extractor 811 and the internal oscillator 812. The CPU 814 is electrically coupled to the waveform monitor 813 and memory 815, and also to both the data decision circuit 231 and the switch 135.

The timing extractor 811 extracts the clock component 33 from the input signal and supplies the clock component 33 to the waveform monitor 813. The timing extractor 811 includes a differential fold-back circuit and an induction filter, and the clock component 33 is extracted by a non-linear sampling method using them.

The internal oscillator 812 generates a sampling clock signal 38. The sampling clock 38 is sufficiently faster than the clock component 33 of the input signal. The internal oscillator 812 sends the sampling clock 38 to the waveform monitor 813.

The waveform monitor 813 receives the input signal and clock component 33 to sample them at a sampling frequency. The sampling frequency is determined by the sampling clock 38. Moreover, the monitor 813 uses the clock component 33 to determine the fold-back frequency. The monitor 813 uses the sampled data and fold-back frequency to produce eye pattern information of the input signal. The monitor 81 sends the eye pattern information to the CPU 814.

The eye pattern information is dependent on the communication environment, thus reflecting change in the communication environment. CPU 814 stores the information in the memory 815 under a predetermined condition. This will be described later in detail.

The CPU 814 includes a comparator section 814a and control signal generator section 814b. The comparator section 814a is electrically coupled to the waveform monitor 813 and memory 815, and also to the control signal generator section 814b. The control signal generator section 814b is electrically coupled to the comparator section 814a, and also to the switch 135.

The switch control circuit 81 controls the operation of the switch 135, and therefore the power supply to the parameter control 233, according to the change in the eye pattern information. For such a control, the comparator section 814a compares the eye pattern information transmitted from the waveform monitor 813 with that stored in the memory 63. The comparator 814a determines whether or not to store the new information in the memory 815 according to the result of the comparison. It will be described in the following more specifically.

Figure 15A:
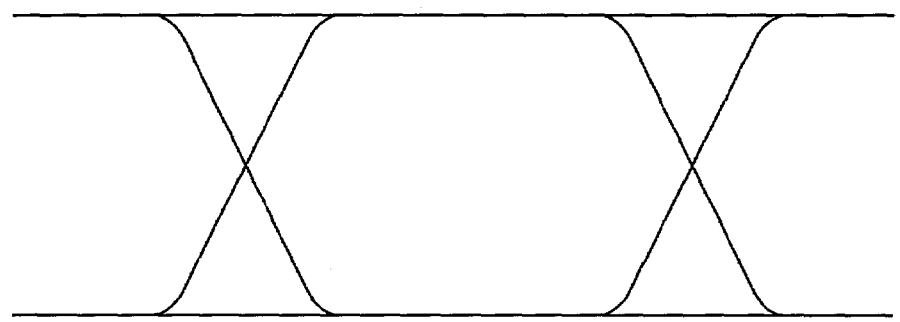
FIGS. 15A and 15B show eye patterns handled in the switch control circuit shown in FIG. 14.
Figure 15B:
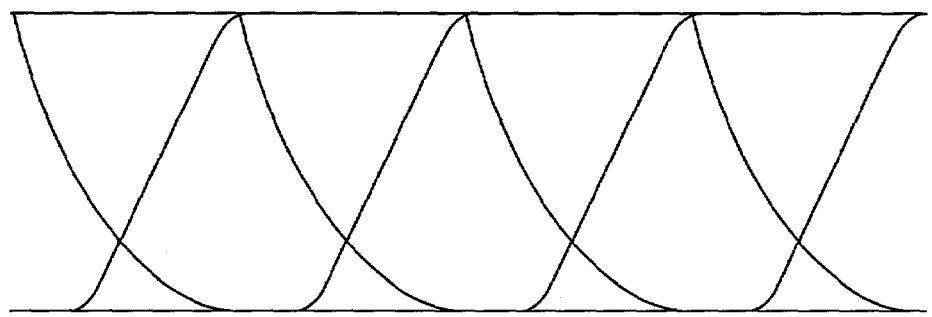

If the difference between the eye pattern information from the waveform monitor 813 and that in the memory 815 is in a predetermined range, then the process in the comparator 814a is finished and the information in the memory 815 remains as it is. If, on the other hand, the difference in the eye pattern information exceeds the range, then the comparator 814a stores the eye pattern information from the waveform monitor 813 in the memory 815. The eye pattern information in the memory 815 is updated in this way. For example, if the eye pattern shown in FIG. 15A is stored in the memory 815 and the eye pattern shown in FIG. 15B is received by the comparator 814a, then the comparator 814a determines that the difference in the information exceeds the range.

Thus, it is determined, based on change in the eye pattern information, whether or not the communication environment has changed beyond a predetermined limit. This is because the eye pattern information reflects the communication environment. If it is determined that the environment has changed beyond the limit, new eye pattern information is stored in the memory 815.

The storing action is performed at a predetermined timing. In response to the storing action, the control signal generator section 814b generates and sends the switch-on signal to the switch 135.

The operations following the transmission of the switch-on signal are similar to those in the first embodiment. That is, the switch 135 closes and the operating power begins to be supplied to the parameter control circuit 233. Therefore, the parameter control 233 begins to operate and the decision parameters are updated only when it is determined that the communication environment has changed. The data decision circuit 231 sends the update-informing signal 37 to the switch control 81 when the circuit 231 receives the updated decision voltage signal and phase shifter signal. The switch control 81 transmits the switch-off signal to the switch 135 in response to the update-informing signal 37. Thus, the switch 135 opens and the power supply to the parameter control 233 is reduced or halted.

The merits of the second embodiment will now be described. Since the power is supplied to the parameter control 233 only when it is necessary to update the decision parameters, the power consumption is reduced. Also, the data regenerator itself can adjust the decision parameters without external control because the data regenerator has the parameter control circuit. It can be determined, based on the eye pattern information reflecting the communication environment, whether or not the update of the parameters is necessary.

The waveform monitor section 813 may measure the jitter amount of the clock component 33 of the input signal, instead of the eye pattern information. The jitter amount is dependent on the communication environment, thus reflecting change in the environment. The comparator section 814a may compare the jitter amount from the waveform monitor 813 with that in the memory 815 and determines whether or not to store the new jitter amount in the memory 815. Thus, it may be determined, based on the change in the jitter amount, whether or not to update the decision parameters.

Third Embodiment

The third embodiment of the optical receiver in accordance with the present invention will now be described. The optical receiver according to the third embodiment is obtained by substituting the switch control circuit 81 in the optical receiver of the second embodiment with a switch control circuit 91 shown in FIG. 16. Apart from this, the configuration of the optical receiver of the third embodiment is the same as that of the optical receiver of the second embodiment.

The switch control circuit 91 will now be described with reference to FIG. 16. FIG. 16 is a block diagram showing the configuration of the circuit 91. The switch control circuit 91 includes a timing extraction circuit 911, a spectral data generator section 912, a CPU 913 and a memory 914. The timing extractor 911 is electrically coupled to the photoelectric conversion section 221 of the photoelectric converter 22, and also to the spectral data generator 912. The spectral data generator 912 is electrically coupled to the photoelectric conversion section 221, and also to both the timing extractor 911 and CPU 913. The CPU 913 is electrically coupled to the spectral data generator 912 and memory 914, and also to the data decision circuit 231 and switch 135.

The timing extractor 911 extracts the clock component 33 from the input signal to send it to the spectral data generator 912. The timing extractor 911 includes a differential fold-back circuit and an induction filter, and the clock component 33 is extracted by a non-linear sampling method using them.

The spectral data generator 912 performs a high-speed Fourier transform on the clock component 33 to generate spectral data. The spectral data is dependent on the communication environment, thus reflecting change in the environment. CPU 913 stores the spectral data in the memory 914 under a predetermined condition. This will be described later in detail.

The CPU 913 includes a comparator section 913a and a control signal generator section 913b. The comparator 913a is electrically coupled to the spectral data generator 912 and the memory 914, and also to the control signal generator 913b. The control signal generator 913b is electrically coupled to the comparator 913a, and also to the switch 135.

The switch control circuit 91 controls the operation of the switch 135, and therefore the power supply to the parameter control 233, according to the change in the spectral data. For such a control, the comparator section 913a compares the spectral data transmitted from the generator 912 with that stored in the memory 63. The comparator 913a determines whether or not to store the new spectral data in the memory 815 according to the result of the comparison. It will be described in the following more specifically.

If the difference between the spectral data from the generator 912 and that in the memory 914 is in a predetermined range, then the process in the comparator 913a is finished and the spectral data in the memory 914 remains as it is. If, on the other hand, the difference in the spectral data exceeds the range, then the comparator 913a stores the spectral data from the generator 912 in the memory 914. The spectral data in the memory 914 is updated in this way.

Figure 17A:
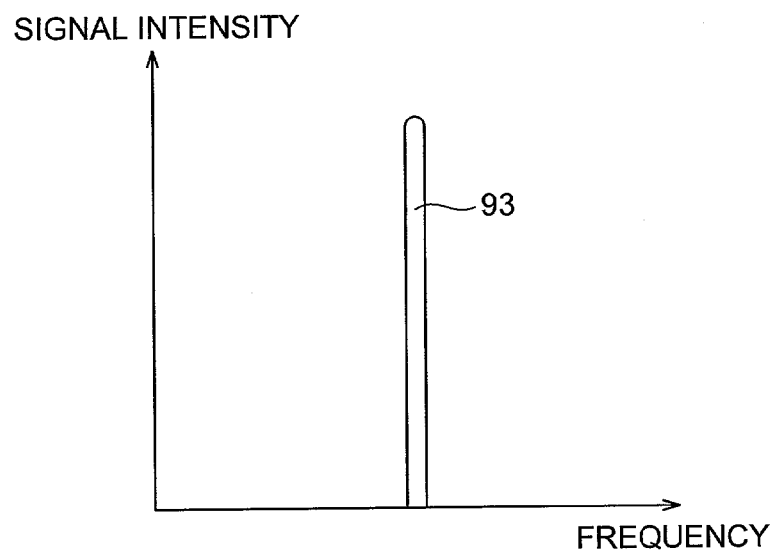
FIGS. 17A and 17B show spectral data handled in the switch control circuit shown in FIG. 16.
Figure 17B:
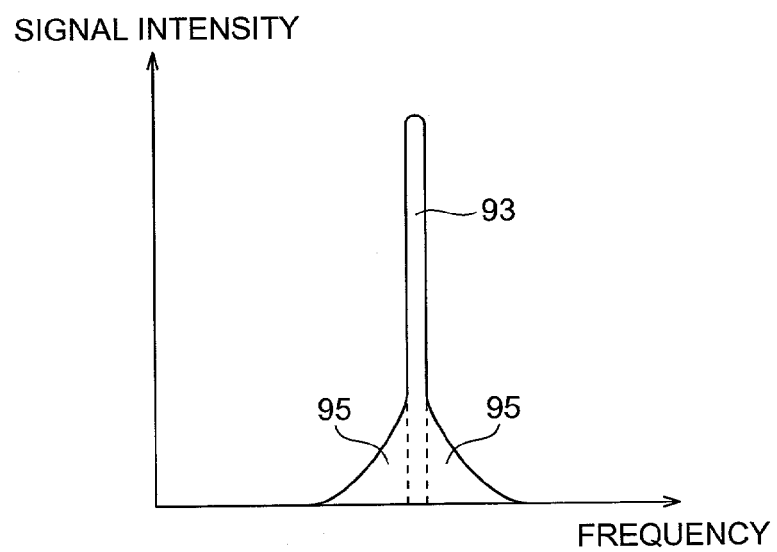

For example, if the spectral data shown in FIG. 17A is stored in the memory 914 and the spectral data shown in FIG. 17B is received by the comparator 913a, then the comparator 913a determines that the difference in the data exceeds the range. The spectral data shown in FIG. 17A includes a frequency component 93 corresponding to the clock component 33. However, the spectral data shown in FIG. 17B includes a frequency component 95 which does not correspond to the clock component 33 in addition to the frequency component 93. Consequently, in general, it can be considered that the jitter amount of the clock component 33 differs between these two data.

Thus, it is determined, based on change in the spectral data, whether or not the communication environment has changed beyond a predetermined limit. If it is determined that the environment has changed beyond the limits, new spectral data is stored in the memory 914.

The storing action is performed at a predetermined timing. In response to the storing action, the control signal generator section 913b generates and sends the switch-on signal to the switch 135.

The operations following the transmission of the switch-on signal are similar to those in the second embodiment, and further description is omitted.

The merits of the third embodiment will now be described. Since the power is supplied to the parameter control 233 only when it is necessary to update the decision parameters, the power consumption is reduced. Also, the data regenerator itself can adjust the decision parameters without external control because the data regenerator has the parameter control circuit. It can be determined, based on the spectral data reflecting the communication environment, whether or not the update of the parameters is necessary.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A data regenerator for outputting a regenerated signal by receiving input electrical signals including a data component and a clock component synchronized to the data component, comprising:
   a first data decision circuit, by receiving the data component, the clock component and a first decision parameter signal, for outputting the regenerated signal;
   a parameter control circuit, by receiving the data component, the clock component and an operating power, for outputting a parameter control signal to a first parameter generator circuit, the parameter control circuit comprising:
      a second data decision circuit, by receiving the data component, the clock component and a second decision parameter signal, for outputting a decision signal,
      an error detection circuit, by receiving the decision signal, for calculating a bit error rate, and
      a variable decision parameter generator circuit including a controller and a second parameter generator circuit, the controller outputting the parameter control signal by receiving the bit error rate output from the error detection circuit, the second parameter generator circuit outputting the second decision parameter signal to the second data decision circuit by receiving the parameter control signal from the controller;
   said first parameter generator circuit, by receiving the parameter control signal from the parameter control circuit and outputting the first decision parameter signal corresponding to the parameter control signal to the first data decision circuit; and
   a power control circuit, by receiving the input signal, for controlling the operating power to the parameter control circuit.

2. The data regenerator according to claim 1,
   wherein the first decision parameter includes a signal level and a phase value, the first data decision circuit using the signal level as a threshold and generating the regenerated signal by shifting a phase of the clock component by the phase value, and retiming the data component with the shifted clock component.

3. The data regenerator according to claim 2, wherein the first data decision circuit comprises:
   a comparator circuit, by receiving the signal level, for discriminating the data component,
   a phase shifter, by receiving the phase value, for shifting the phase of the clock component by the phase value, and
   a flip-flop for latching the discriminated data component output from the comparator circuit by the clock component shifted in phase by the phase shifter.

4. The data regenerator according to claim 1,
   wherein the power control circuit is configured to determine a change of a communication environment based on the input signals, and to permit the parameter control circuit to be supplied with the operating power to update the first decision parameter signal when the communication environment has changed, and to halt the parameter control circuit when the update is completed.

5. The data regenerator according to claim 1,
   wherein the power control circuit includes a switch and a switch control circuit, the parameter control circuit being supplied with the operating power through the switch, the switch control circuit controlling the operation of the switch depending on environment-dependent information included in the input signals.

6. The data regenerator according to claim 5, wherein the switch control circuit includes:
a processor, by receiving the environment-dependent data, for detecting a change in the environment-dependent information to send a switching signal to the switch when the change is detected; and
a memory, coupled to the processor, for receiving and storing the environment-dependent information, wherein the operating power is supplied to the parameter control circuit when the switch receives the switching signal.

7. The data regenerator according to claim 6, wherein the processor includes,
a comparator section configured to receive the environment-dependent information, to compare the received environment-dependent information with environment-dependent information stored within the memory to determine the change of the environment-dependent information, and to output a comparison result, and
s signal generator section coupled to the comparator section and the switch for receiving the comparison result from the comparator and outputting the switching signal.

8. The data regenerator according to claim 7, wherein the input signals include a pilot component corresponding to the environment-dependent information.

9. The data regenerator according to claim 7, wherein the input signals include a pilot component with estimation of dispersion distortion attributed to the input signals and
the switch control circuit further includes a circuit coupled to the comparator section for extracting the estimation of the dispersion distortion from the pilot component.

10. The data regenerator according to claim 7, wherein the input signals include a pilot component with information of dispersion attributed to the input signal, the switch control circuit further includes a circuit for extracting the information indicating the total dispersion from the pilot component, and
the processor further comprises a calculator section for calculating the total dispersion using the information indicating the total dispersion.

11. The data regenerator according to claim 7, wherein the switch control circuit further comprises,
an oscillator circuit for generating a sampling clock signal,
a timing extraction circuit for extracting a clock component from the input signals, and
a waveform monitor section, coupled to the comparator, for sampling the extracted clock component and the input signals by the sampling clock signal to produce an eye pattern of the input signals as the environment-dependent information.

12. The data regenerator according to claim 7, wherein the switch control circuit further comprises,
a timing extraction circuit for extracting a clock component from the input signals, and
a section, coupled to the comparator, for determining jitter amount in the extracted clock component as the environment-dependent information.

13. The data regenerator according to claim 7, wherein the switch control circuit further comprises,
a timing extraction circuit for extracting a clock component from the input signals, and
a spectral data generator section, coupled to the comparator, for generating a spectral data from the extracted clock component as the environment-dependent information.

14. The data regenerator according to claim 6, wherein the processor sends a switching signal to put off the switch, responding to information of updating the decision parameter output from the first data decision circuit, to halt the parameter control circuit.

15. An optical receiver for receiving optical signals with a plurality of wavelengths, comprising:
an optical demultiplexer configured to receive the optical signals and to divide the received optical signals into a plurality of divided optical signals each having a wavelength different from each other; and
a plurality of optical receiving units, each comprising:
a photoelectric converter configured to receive one of divided optical signals and to convert the received optical data into a corresponding electrical signal, and
a data regenerator according to claim 1 configured to receive the corresponding electrical signal output from the photoelectric converter.

16. An optical receiver for receiving optical signals with a plurality of wavelengths, comprising:
an optical demultiplexer configured to receive the optical signals and to divide the received optical signals into a plurality of divided optical signals each having a wavelength different from each other; and
a plurality of optical receiving units, each including,
a photoelectric converter configured to receive one of divided optical signals and to convert the received optical data into a corresponding electrical signal, and
a data regenerator according to claim 5 configured to receive the corresponding electrical signal output from the photoelectric converter.

* * * * *